United States Patent
Huang et al.

(10) Patent No.: US 11,902,946 B2
(45) Date of Patent: Feb. 13, 2024

(54) FREQUENCY DOMAIN ALLOCATION TECHNIQUES

(71) Applicant: QUALCOMM Incorporated, San Diego, CA (US)

(72) Inventors: Yi Huang, San Diego, CA (US); Muhammad Sayed Khairy Abdelghaffar, San Jose, CA (US); Seyedkianoush Hosseini, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 178 days.

(21) Appl. No.: 17/330,243

(22) Filed: May 25, 2021

(65) Prior Publication Data
US 2021/0377938 A1    Dec. 2, 2021

Related U.S. Application Data

(60) Provisional application No. 63/031,475, filed on May 28, 2020.

(51) Int. Cl.
*H04L 5/14*  (2006.01)
*H04B 7/06*  (2006.01)
(Continued)

(52) U.S. Cl.
CPC ....... *H04W 72/0446* (2013.01); *H04L 5/0094* (2013.01); *H04W 72/0453* (2013.01)

(58) Field of Classification Search
CPC ......... H04W 72/0446; H04W 72/0453; H04W 72/1263; H04W 72/23; H04L 5/0094; H04L 5/14; H04L 5/001
See application file for complete search history.

(56) References Cited

U.S. PATENT DOCUMENTS 11,116,001 B2    9/2021 Wei et al.
2019/0053227 A1*  2/2019 Huang .............. H04L 25/03006
(Continued)

FOREIGN PATENT DOCUMENTS

CN    106664517 A    5/2017
EP      3340520 A1    6/2018
WO   2019157628 A1   8/2019

OTHER PUBLICATIONS

International Search Report and Written Opinion—PCT/US2021/034359—ISA/EPO—dated Sep. 23, 2021.
(Continued)

*Primary Examiner* — Jae Y Lee
*Assistant Examiner* — Aixa A Guadalupe Cruz
(74) *Attorney, Agent, or Firm* — Shumaker & Sieffert, P. A. / Qualcomm

(57) ABSTRACT

In wireless communication systems using a subband full duplex carrier, a single slot may include one or more uplink (UL) portions and/or one or more downlink (DL) portions. In a case where a scheduler operating in a 3GPP New Radio (NR) network utilizes a Type 0 or Type 1 resource allocation, part of the DL allocation may fall within the UL portion of the carrier designated by the slot format, or vice versa. User equipment (a UE) may perform a logical operation that identifies, as a usable downlink resource allocation, a set of resource blocks belonging to both a given UL/DL resource allocation and a set of resources designated for UL/DL transmission in the slot format.

31 Claims, 19 Drawing Sheets

(51) Int. Cl.
*H04W 72/0446* (2023.01)
*H04L 5/00* (2006.01)
*H04W 72/0453* (2023.01)

(56) References Cited

U.S. PATENT DOCUMENTS

| | | | |
|---|---|---|---|
| 2019/0059084 A1* | 2/2019 | Lee | H04L 5/0091 |
| 2019/0089502 A1* | 3/2019 | Yi | H04W 16/14 |
| 2020/0260417 A1* | 8/2020 | Jo | H04L 5/0053 |
| 2020/0374913 A1 | 11/2020 | Su et al. | |
| 2021/0105774 A1* | 4/2021 | Oh | H04L 5/0094 |
| 2021/0258100 A1* | 8/2021 | Hassan Hussein | H04W 72/0453 |
| 2022/0217543 A1* | 7/2022 | Murayama | H04L 5/0044 |
| 2022/0361231 A1* | 11/2022 | Oh | H04W 72/1268 |

OTHER PUBLICATIONS

3GPP TS 36.213: "3rd Generation Partnership Project, Technical Specification Group Radio Access Network, Evolved Universal Terrestrial Radio Access (E-UTRA), Physical Layer Procedures (Release 16)", 3GPP Standard, Technical Specification, 3rd Generation Partnership Project (3GPP), Mobile Competence Centre, 650, Route Des Lucioles, F-06921 Sophia-Antipolis Cedex, France, vol. RAN WG1, No. V16.1.0, Apr. 3, 2020 (Apr. 3, 2020), pp. 60-284, XP051893810, Retrieved from the Internet: URL: ftp://ftp.3gpp.org/Specs/archive/36_series/36.213/36213-g10.zip.
3GPP TS 38.214: "3rd Generation Partnership Project; Technical Specification Group Radio Access Network; NR; Physical Layer Procedures for Data (Release 16)", 3GPP Draft, 38214-G10, 3GPP TS 38.214, 3rd Generation Partnership Project (3GPP), vol. RAN WG1. No. V16.1.0, Apr. 3, 2020 (Apr. 3, 2020), pp. 1-151, XP051893823, Retrieved from the Internet: URL: URL: https://ftp.3gpp.org/Specs/archive/38_series/38.214/38214-g10.zip 38214-g10. [retrieved on Apr. 3, 2020], pp. 44-47.
Ericsson: "Flexible POSCH/PUSCH Starting PRB for MTC", 3GPP TSG-RAN WG1 Meeting #93, 3GPP Draft, R1-1805853 Flexible Posch-Pusch Starting PRB for MTC, 3rd Generation Partnership Project (3GPP), Mobile Competence Centre, 650, Route Des Lucioles, F-06921 Sophia-Antipolis Cedex, France, vol. Ran WG1, No. Busan, Korea, Feb. 21, 2018-May 25, 2018, May 20, 2018 (May 20, 2018), pp. 1-22, XP051441073, Retrieved from the Internet: URL: http://www.3gpp.org/ftp/Meetings%5F3GPP%5FSYNC/RAN1/Docs/ [retrieved on May 20, 2018].

* cited by examiner

FREQUENCY DOMAIN ALLOCATION TECHNIQUES

CROSS-REFERENCE TO RELATED APPLICATIONS

This application claims priority to, and the benefit of the filing date of, U.S. Provisional Patent Application No. 63/031,475 entitled "Frequency Domain Allocation in Sub-band Full Duplex and filed on May 28, 2020, the disclosure of which is incorporated herein by reference

TECHNICAL FIELD

The technology discussed below relates generally to wireless communication systems, and more particularly, to resource allocation in full duplex scenarios (e.g., scenarios using one or more sub-band full duplex slots for communication). Embodiments can enable and provide e techniques for mitigating and/or resolving potential conflicts between a slot format and a resource allocation for that slot.

INTRODUCTION

In wireless communication, a full duplex link is one where both endpoints can simultaneously communicate with one another on the same set of resources. Many wireless communication systems provide for full duplex emulation, with simultaneous communication in both directions between respective endpoints, but with the different-direction transmissions using different sets of resources. For example, time division duplex (TDD) provides for transmissions in different directions on a given channel to be separated from one another using time division multiplexing That is, at some times the channel is dedicated for transmissions in one direction, while at other times the channel is dedicated for transmissions in the other direction. In another example, frequency division duplex (FDD) provides for transmissions in different directions to operate at different carrier frequencies.

In a wireless communication system utilizing orthogonal frequency division multiplexing (OFDM), a duplexing scheme often called sub-band full duplex (SBFD) may be used. SBFD differs from conventional FDD in that in FDD, a given carrier and/or bandwidth part (BWP) is typically fully dedicated either for uplink or downlink communication. With SBFD, a portion of the time-frequency resources on a given carrier are dedicated for uplink, and a portion of the time-frequency resources on that same carrier support downlink (e.g., one BWP is portioned into uplink and downlink portions). Accordingly, an endpoint communicating utilizing SBFD transmits and receives at the same time, but on different frequency resources of the same carrier. That is, the downlink resource is separated from the uplink resource in the frequency domain.

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In various aspects, the present disclosure provides for resource allocation features in a wireless communication system. Some aspects are generally configured to address an issue that may arise in sub-band full duplex (SBFD) over a BWP corresponding to a single carrier (also sometimes called flexible duplex). In some aspects, in SBFD, a single slot may include one or more uplink (UL) portions and/or one or more downlink (DL) portions. In a case where a scheduler operating in a 3GPP New Radio (NR) network utilizes a Type 0 or Type 1 resource allocation, it may arise that the DL allocation partially falls in the UL portion of the BWP designated by the slot format, or vice versa. In some aspects, a user equipment (UE) may perform a logical operation that identifies, as the usable uplink/downlink resource allocation, a set of resource blocks belonging to both a given UL/DL resource allocation and a set of resources designated for UL/DL transmission in the slot format.

Some aspects of the disclosure provide a method of wireless communication operable by user equipment (a UE). The method includes receiving information indicating a slot format configuration; receiving a resource allocation for the slot that overlaps with at least a portion of the first frequency portion; and communicating, using a transceiver over a set of usable resources that belongs to both the resource allocation and the first frequency portion. The information indicating the slot format configuration identifies a first frequency portion of a slot and a second frequency portion of the slot and one of the first or the second frequency portion is reserved for downlink communications and another of the first or the second frequency portion is reserved for uplink communications. Communicating over the set of usable resources comprises either receiving a downlink communication over the set of usable resources, or transmitting an uplink communication over the set of usable resources.

Further aspects of the disclosure provide wireless communication device operable as user equipment (a UE). The device includes means for receiving information indicating a slot format configuration; means for receiving a resource allocation for the slot that overlaps with at least a portion of the first frequency portion; and means for communicating over a set of usable resources that belongs to both the resource allocation and the first frequency portion. The information indicating the slot format configuration identifies a first frequency portion of a slot and a second frequency portion of the slot and one of the first or the second frequency portion is reserved for downlink communications and another of the first or the second frequency portion is reserved for uplink communications. Communicating over the set of usable resources comprises either receiving a downlink communication over the set of usable resources, or transmitting an uplink communication over the set of usable resources.

Further aspects of the disclosure provide a non-transitory computer-readable medium storing computer-executable code. The code includes instructions for causing a user equipment (UE) to receive information indicating a slot format configuration; receive a resource allocation for the slot that overlaps with at least a portion of the first frequency portion; and communicate over a set of usable resources that belongs to both the resource allocation and the first frequency portion. The information indicating a slotformat configuration identifies a first frequency portion of a slot and a second frequency portion of the slot. One of the first or the second frequency portion is reserved for downlink communications and another of the first or the second frequency portion is reserved for uplink communications. Communicating over the set of usable resources comprises either: receiving a downlink communication over the set of usable resources, or transmitting an uplink communication over the set of usable resources.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
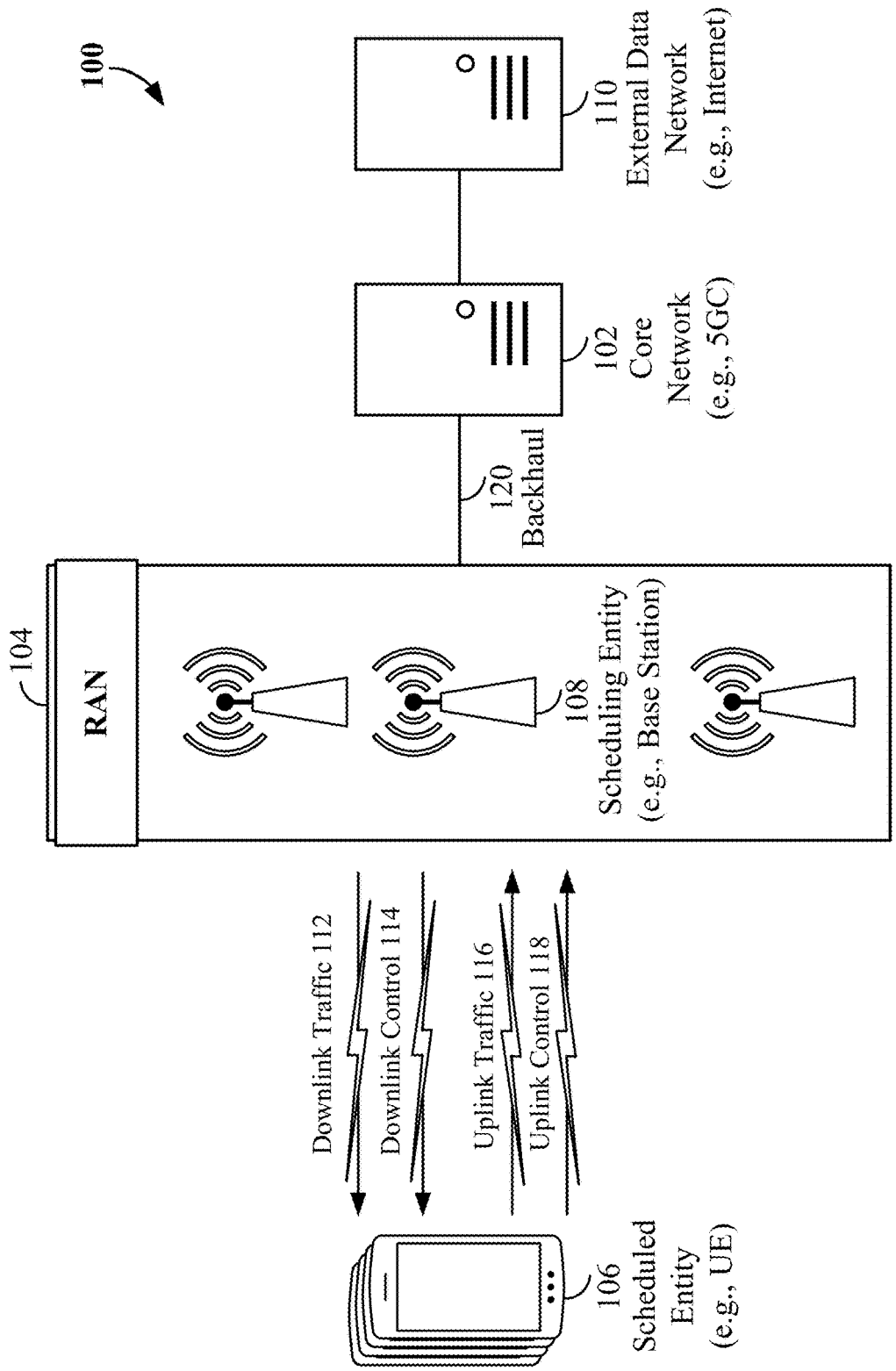
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Communication devices incorporating aspects described herein may include an array of device types. Although certain examples are discussed with respect to features or operation of a scheduled entity such as user equipment (UE) or other devices, aspects of this disclosure relate to, and may implicitly describe, corresponding features and operation of one or more scheduling entities such as base stations and similar devices and systems. Similarly, although certain examples are discussed with respect to downlink or uplink communications, it will be understood that various of these examples will be applicable, respectively, to uplink or downlink communications.

According to some aspects, the present disclosure enables and provides several mechanisms and techniques for resolving one or more potential conflicts that may arise in communication scenarios. For example, conflict scenarios may arise for a Type 0 or Type 1 frequency domain resource allocation in sub-band full-duplex (SBFD). Such conflict may occur when allocated downlink (DL) resources do not exactly match resources that a slot format has designated for DL communication, or when uplink (UL) resources do not exactly match resources that a slot format has designated for UL communication. Mitigating and/or resolving these potential conflicts, as discussed herein, yields communication devices having improved communication features, efficient communications, and improved scheduling techniques for wireless transmission (e.g., uplink and downlink communications).

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106 may utilize resources allocated by the scheduling entity 108. For example, the UEs 106 may be scheduled entities.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may transmit downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
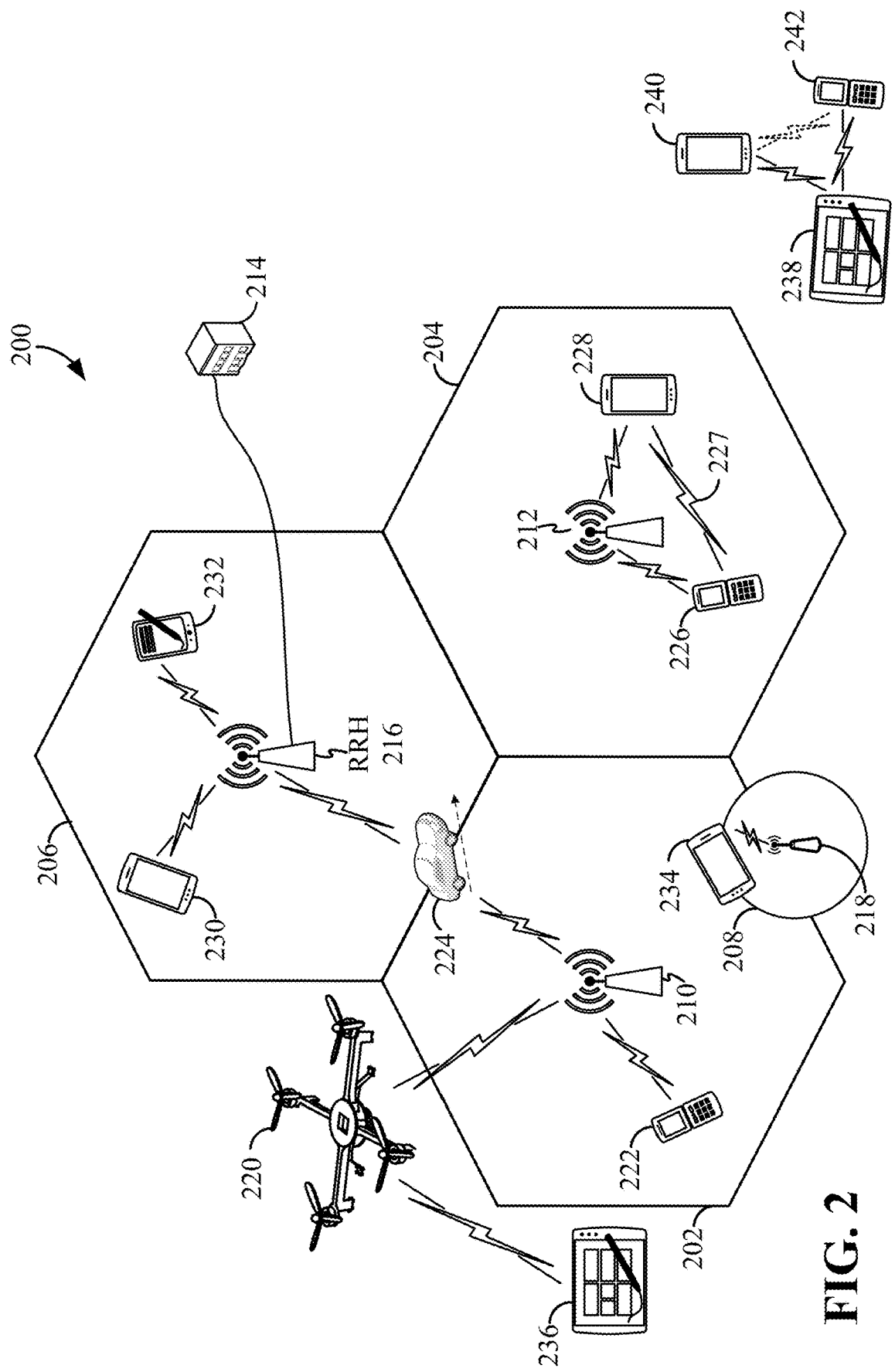
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 3. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

A variety of structural arrangements for resources may be utilized when deploying wireless communication devices according to techniques discussed herein. As an example, a frame may generally refer to a duration of 10 ms for wireless transmissions, with each frame consisting of 10 subframes of 1 ms each. On a given carrier, there may be one set of frames in the UL, and another set of frames in the DL. Referring now to FIG. 3, an expanded view of an exemplary DL subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or as a resource block (RB) 308, which contains any suitable number of consecutive subcarriers in the frequency domain. In one example, an RB may include 12 subcarriers. In some examples, an RB may include any suitable number of consecutive OFDM symbols in the time domain.

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each subframe 302 (e.g., a 1 ms subframe) may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., 1, 2, 4, or 7 OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Figure 3:
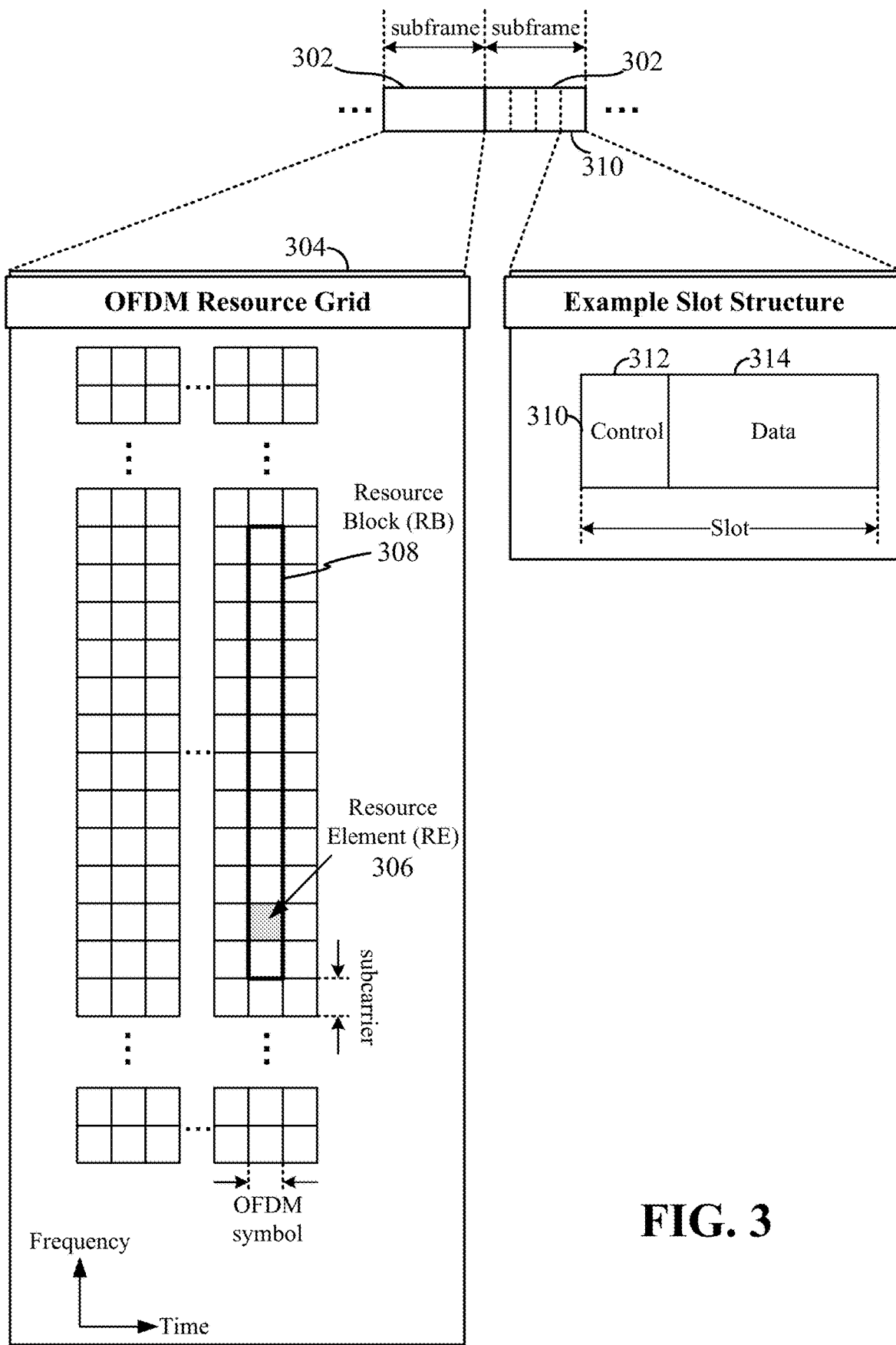
FIG. 3 is a schematic illustration of an organization of wireless resources in an air interface utilizing orthogonal frequency divisional multiplexing (OFDM) according to some aspects.

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity or base station 108) may allocate one or more REs 306 (e.g., within a control region 312) to carry DL control information 114 including one or more DL control channels that generally carry information originating from higher layers, such as a physical broadcast channel (PBCH), a physical downlink control channel (PDCCH), etc., to one or more scheduled entities or UEs 106. In addition, DL REs may be allocated to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

The synchronization signals PSS and SSS (collectively referred to as SS), and in some examples, the PBCH, may be transmitted in an SS block that includes 4 consecutive OFDM symbols, numbered via a time index in increasing order from 0 to 3. In the frequency domain, the SS block may extend over 240 contiguous subcarriers, with the subcarriers being numbered via a frequency index in increasing order from 0 to 239. Of course, the present disclosure is not limited to this specific SS block configuration. Other non-limiting examples may utilize greater or fewer than two synchronization signals; may include one or more supplemental channels in addition to the PBCH; may omit a PBCH; and/or may utilize nonconsecutive symbols for an SS block, within the scope of the present disclosure.

The PDCCH may carry downlink control information (DCI) for one or more UEs in a cell. This can include, but is not limited to, power control commands, scheduling information, a grant, and/or an assignment of REs for DL and UL transmissions.

In an UL transmission, a transmitting device (e.g., a scheduled entity 106) may utilize one or more REs 306 to carry UL control information 118 (UCI). The UCI can originate from higher layers via one or more UL control channels, such as a physical uplink control channel (PUCCH), a physical random access channel (PRACH), etc., to the scheduling entity 108. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the scheduling entity 108 to schedule uplink transmissions. Here, in response to the SR transmitted on the control channel 118, the scheduling entity 108 may transmit DCI 114 that may schedule resources for uplink packet transmissions.

UCI may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may transmit a HARQ retransmission, which may implement chase combining, incremental redundancy, etc.

In addition to control information, one or more REs 306 (e.g., within the data region 314) may be allocated for user data or traffic data. Such traffic may be carried on one or more traffic channels, such as, for a DL transmission, a physical downlink shared channel (PDSCH); or for an UL transmission, a physical uplink shared channel (PUSCH).

In order for a UE to gain initial access to a cell, the RAN may provide system information (SI) characterizing the cell. This system information may be provided utilizing minimum system information (MSI), and other system information (OSI). The MSI may be periodically broadcast over the cell to provide the most basic information required for initial cell access, and for acquiring any OSI that may be broadcast periodically or sent on-demand. In some examples, the MSI may be provided over two different downlink channels. For example, the PBCH may carry a master information block (MIB), and the PDSCH may carry a system information block type 1 (SIB1). In the art, SIB1 may be referred to as the remaining minimum system information (RMSI).

OSI may include any SI that is not broadcast in the MSI. In some examples, the PDSCH may carry a plurality of SIBs, not limited to SIB1, discussed above. Here, the OSI may be provided in these SIBs, e.g., SIB2 and above.

The channels or carriers described above and illustrated in FIGS. 1 and 3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The air interface in the radio access network 200 may utilize one or more duplexing algorithms. Duplex refers to a point-to-point communication link where both endpoints can communicate with one another in both directions. Full duplex means both endpoints can simultaneously communicate with one another on the same set of resources. Half duplex means only one endpoint can transmit information to the other at a time. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction (e.g., DL), while at other times the channel is dedicated for transmissions in the other direction (e.g., UL), where the direction may change very rapidly, e.g., several times per slot.

Figure 4:
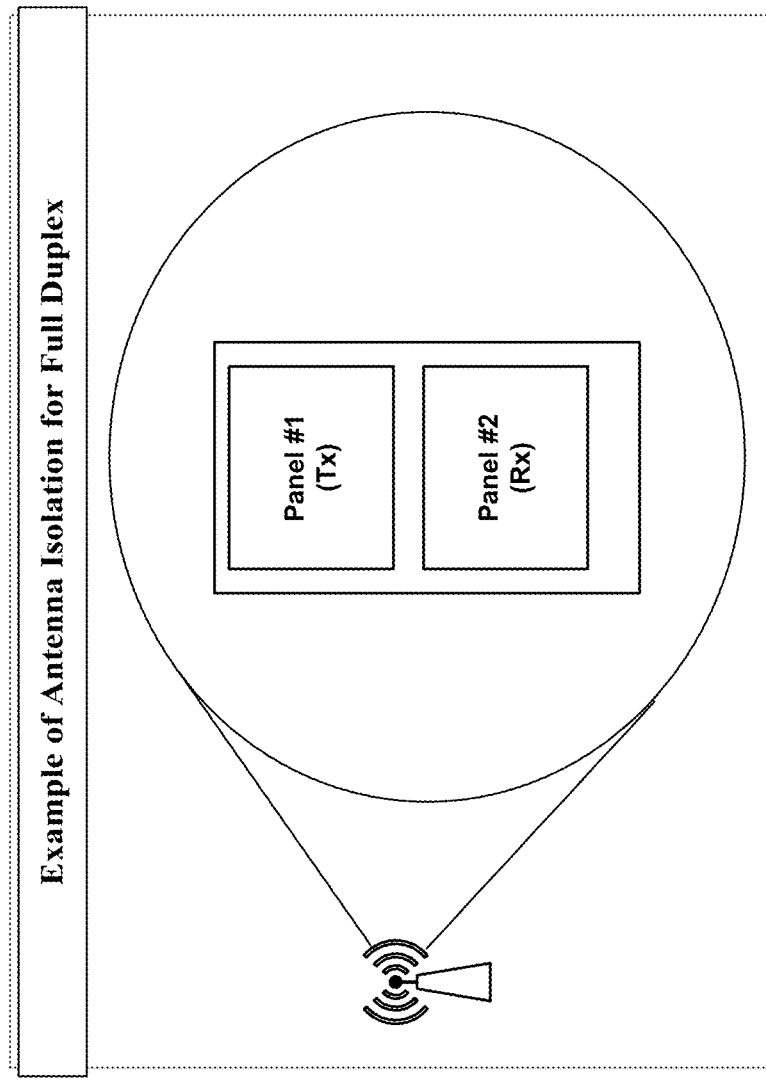
FIG. 4 is a detail view of an example of a base station with physically separated and isolated antenna panels according to some aspects.

In a wireless link, a full duplex channel generally relies on physical isolation of a transmitter and receiver, and suitable interference cancellation technologies. In some examples, a base station may provide for improved isolation between simultaneous transmission and reception operations by utilizing two separate, physically isolated antenna panels for the UL and DL, respectively. As one illustrative example shown in FIG. 4, when communicating over a full duplex carrier, the base station may utilize panel 1 for DL transmission, while the base station may utilize panel 2 for UL reception.

Nevertheless, even with such physical isolation of transmit and receive antenna panels, a wireless communication endpoint carrying out full duplex communication still faces significant interference. And in particular, self-interference generated at that same endpoint can be substantial. That is, because the transmit and receive antennas at the base station are so close to each other, while the base station is transmitting a DL signal, it is also interfering on the nearby receive antennas. This can make it difficult for the base station to decode a received UL signal.

Figure 5:
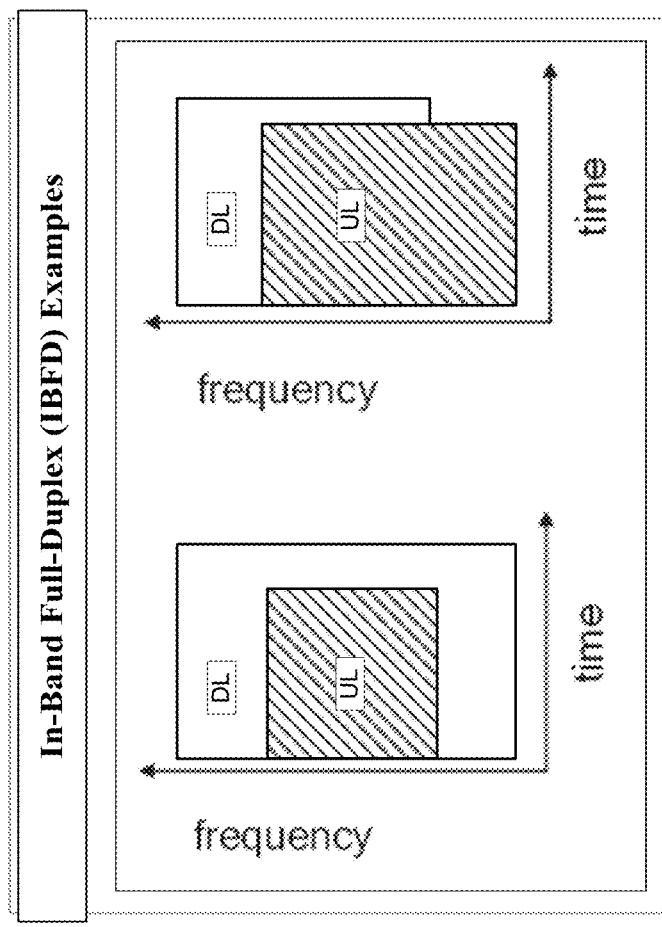
FIG. 5 is a schematic illustration of in-band full duplex (IBFD) communication according to some aspects.

One example of a full duplex communication scheme referred to as in-band full duplex (IBFD), with two examples illustrated in FIG. 5. In IBFD, generally, UL and DL communications overlap in time and frequency. In some examples, the overlap can be partial, as shown on the right where only a part of the UL overlaps with the DL. And in some examples, the overlap can be complete, as shown on the left where the entire UL overlaps with the DL.

Recently, interest has turned toward what may be referred to as sub-band full duplex (SBFD) or flexible duplex. SBFD differs from FDD in that in FDD, a given carrier is typically fully dedicated either for UL or DL communication. With SBFD, a portion of the time-frequency resources on a given carrier are dedicated for UL, and a portion of the time-frequency resources on that same carrier support DL. Accordingly, an endpoint communicating utilizing SBFD transmits and receives at the same time, but on different frequency resources of the same carrier. That is, the DL resource is separated from the UL resource in the frequency domain.

Figure 6:
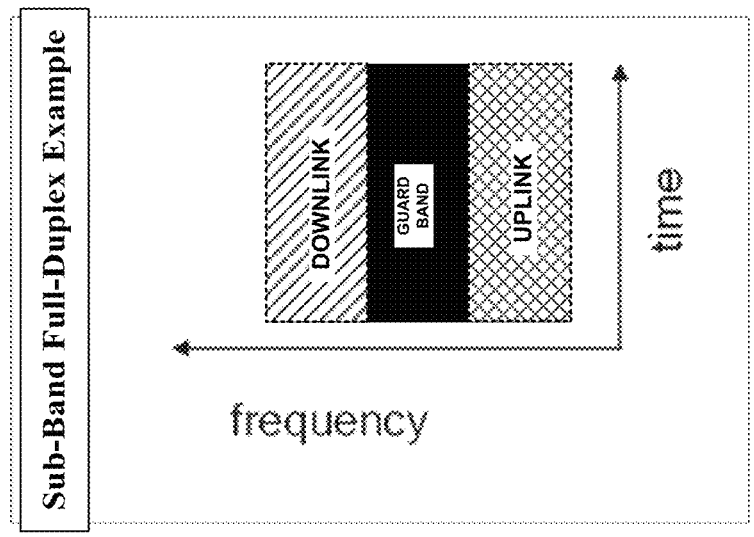
FIG. 6 is a schematic illustration of sub-band full duplex (SBFD) communication according to some aspects.

FIG. 6 illustrates one example of an SBFD carrier. In the illustrated example, the DL and UL portions of a BWP are separated from one another in frequency, with a guard band (GB) between the respective UL and DL portions to reduce interference such as leakage of the UL into the DL, or leakage of the DL into the UL. However, because the GB may be relatively narrow (e.g., 5 RBs) compared to the separation between carriers in conventional FDD, wireless communication utilizing SBFD may suffer from a greater amount of interference than conventional FDD. With respect to self-interference, a base station utilizing SBFD may suffer from its DL transmission leaking into its UL reception; and a UE utilizing SBFD may suffer from its UL transmission leaking into its DL reception.

Referring once again to FIG. 4, when communicating using SBFD, a base station may utilize panel 1 for DL transmission over one portion of a BWP, while using panel 2 for UL reception over another portion of the BWP. Accordingly, self-interference at the base station can be reduced to some degree via physical isolation of the antennas. In various examples, the respective UL and DL portions of the SBFD carrier may be allocated within a given slot utilizing any suitable configuration, separated by frequency, time, or both frequency and time.

Figure 7:
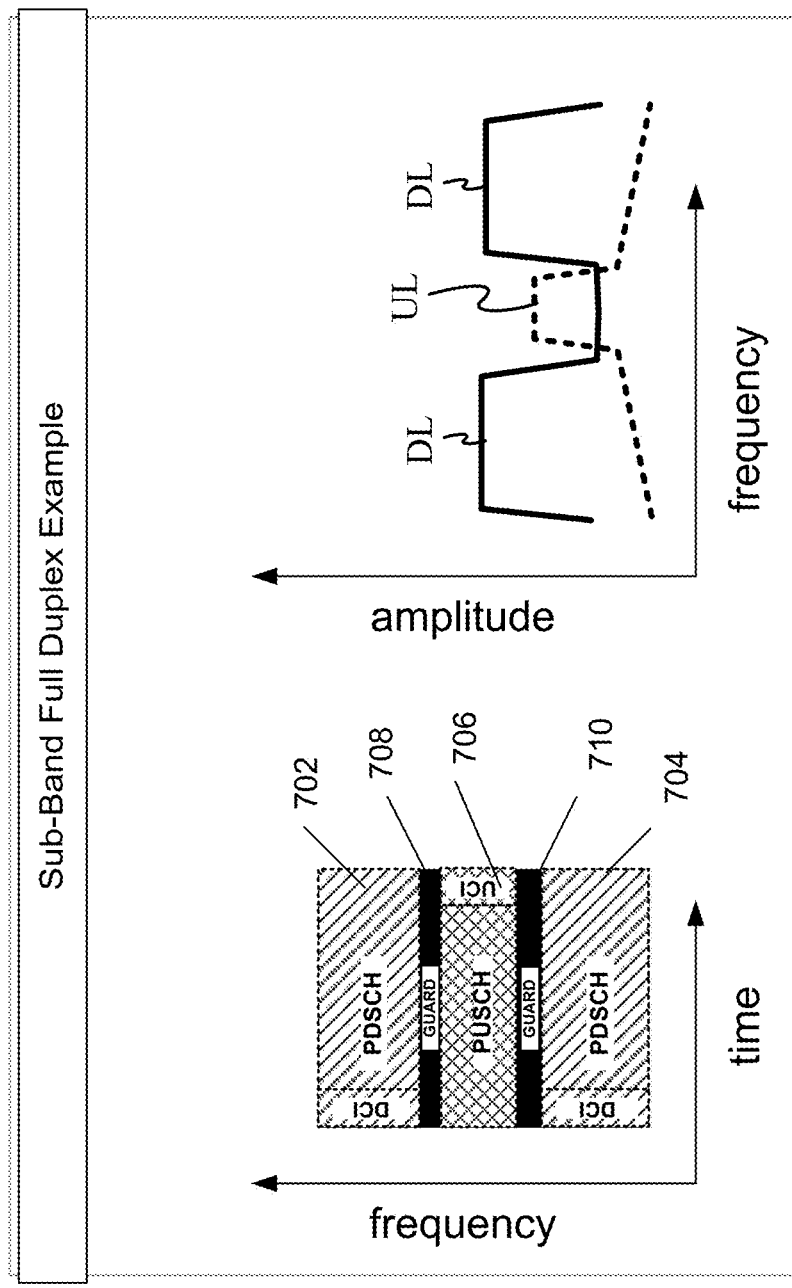
FIG. 7 is a schematic illustration of a slot configured for SBFD communication according to some aspects.

FIG. 7 shows an example of a slot format for wireless communication utilizing SBFD according to an aspect of the present disclosure. In the illustrated slot, the upper portion 702 and lower portion 704 of the carrier are utilized for DL communication, and in between those portions lies an UL portion 706 utilized for UL communication. Two GBs 708 and 710 separate the UL portion from the DL portions, located immediately above and below the UL portion in frequency.

Techniques discussed herein include a variety of configuration scenarios. For example, in certain scenarios it may be useful for a base station or other scheduling entity to reconfigure communication with a UE or other scheduled entity on an as-needed basis. Such reconfiguration may employ SBFD in one or more slots. For example, a base station may signal a UE that one or more slots will use SBFD in order to improve latency for certain bidirectional communication applications where latencies lower than those achievable using a TDD slot format are required. The base station may determine that SBFD should be used for certain slots automatically, or in response to a request received by the network from the UE or another device on the network. Such as-needed configuration changes may be made using semi-static resource allocation techniques (e.g., for configuration changes that are intended to occur infrequently) or using dynamic resource allocation techniques (e.g., when a need for rapid configuration changes is expected).

Figure 8:
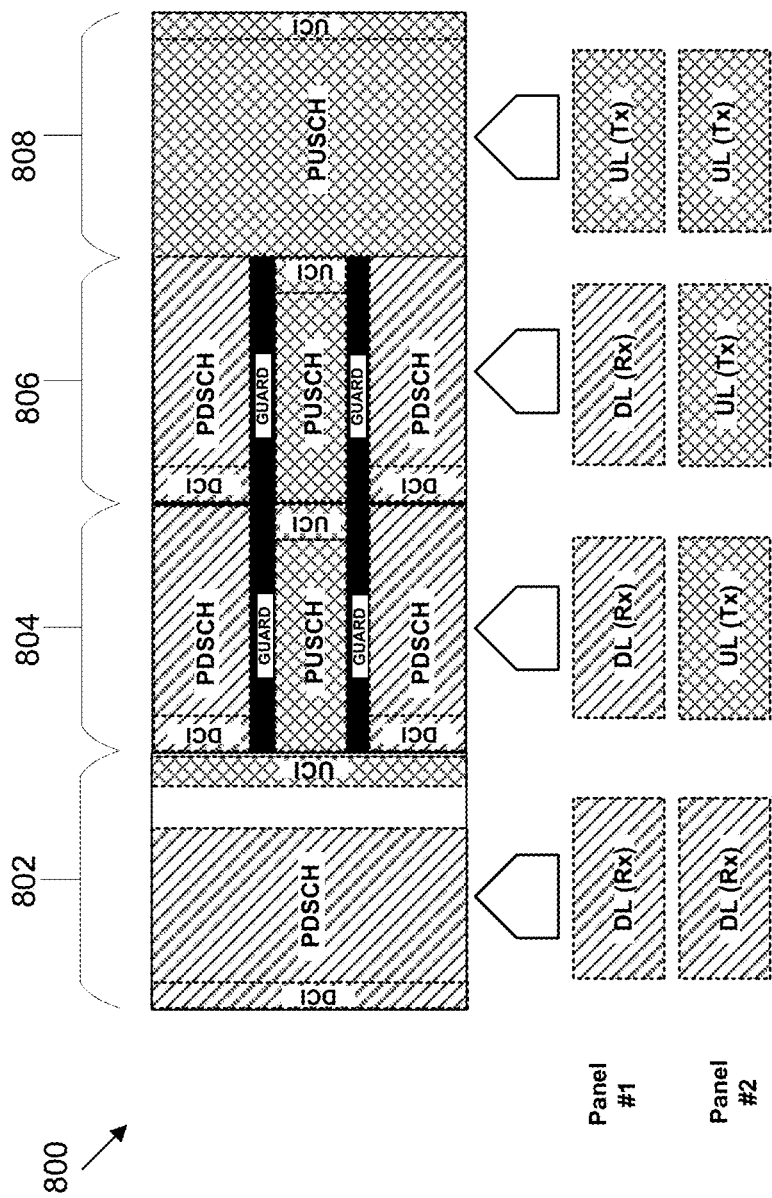
FIG. 8 is a schematic illustration of a series of slots on a flexible duplex carrier, and corresponding operation of physically separated and isolated antenna panels, according to some aspects.

FIG. 8 shows a sequence 800 of four consecutive slots 802, 804, 806, and 808 in a carrier configured to allow dynamic reconfiguration between slots for TDD and SBFD communication. In some examples, the respective portions of the carrier within a given slot may be designated as UL portion or DL portion by the base station and signaled to a UE by utilizing a suitable indication or configuration message that enables a UE to determine a slot format. For example, a UE may determine a slot format for a given slot based on a suitable indication or configuration message provided by a base station. This indication or configuration message may be included within DCI, within higher-layer (e.g., RRC) signaling, or some combination of these. The slot format corresponds to a configuration of REs within a slot, with each RE being designated as being either for UL, DL, or, in some examples, as being flexible (can be either UL or DL). In various examples, a configuration or indication message utilized by a UE to determine a slot format may correspond to any suitable number of one or more slots, and may correspond to contemporaneous and/or later-used slot(s).

As illustrated, the first slot 802 is configured for TDD, wherein the full carrier bandwidth is utilized for DL communication, other than the final one or two OFDM symbols of the slot, where the full carrier bandwidth may be utilized for UL communication, such as a HARQ-ACK, CSF, and/or uplink user data. For example, the first slot 802 may be considered a "special" slot. The second slot 804 and third slot 806 are configured utilizing SBFD in essentially the same way as described above and illustrated in FIG. 7, with DL communication at the upper and lower portions of the carrier and UL communication in between. As discussed above, the UL portion of the carrier is shown being separated from the DL portions of the carrier by suitable-bandwidth guard bands above and below the UL portion. As shown, the fourth slot 808 is configured for TDD, and is fully-allocated for UL communication.

In an example of a base station including the two antenna panels described above and illustrated in FIG. 4, the operation of the respective antenna panels during the different slots is illustrated below the respective slots in FIG. 8. That is, in the first slot 802, both antenna panels are utilized for DL communication; and in the fourth slot 808, both antenna panels are utilized for UL communication. In the second and third illustrated slots 804 and 806, which are configured for SBFD, the top antenna panel is configured for DL transmission, while the bottom antenna panel is configured for UL reception.

Figure 9:
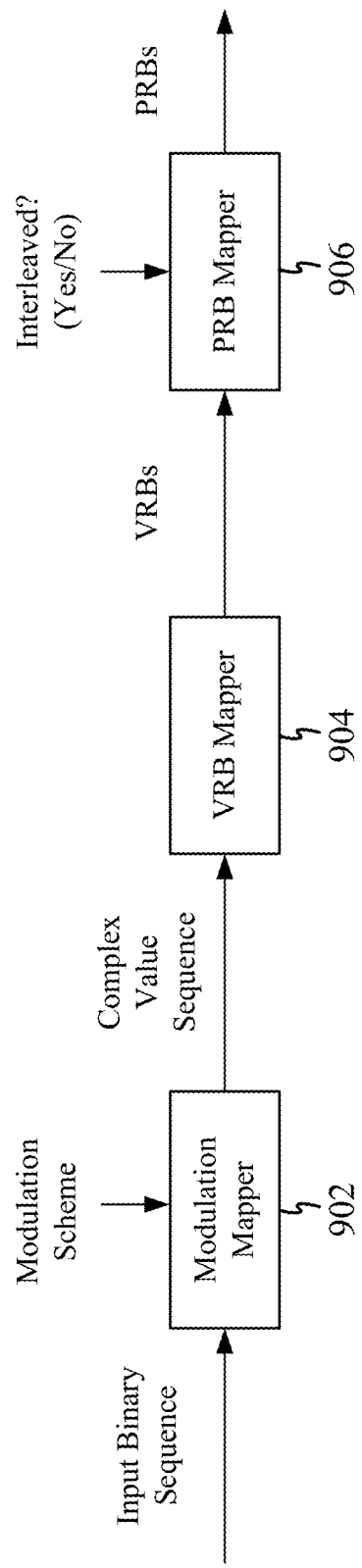
FIG. 9 is a block diagram illustrating example hardware and/or circuitry features configured to perform resource allocation techniques according to some aspects.

FIG. 9 shows an illustrative sequence of processing blocks that may be included in a base station to handle downlink transmissions or that may be included in a UE for uplink transmissions. A modulation mapper 902 may transform a codeword that includes a sequence of binary digits, '0' or '1', into a sequence of complex-valued symbols corresponding to a selected modulation scheme. After the modulation mapper 902, a virtual resource block (VRB) mapper 904 maps the complex-valued sequence to resource elements (REs) in selected VRBs; and a physical resource block (PRB) mapper 906 maps the VRBs to PRBs. Here, the PRBs are the actual physical resources with which the base station or UE makes a transmission. A base station or UE may utilize VRBs in this manner between the modulation mapper 902 and the PRB mapper 906 to provide for interleaving in a wireless transmission. In some examples, the modulation mapper 902 is also responsible for rate-matching (i.e., ensuring that the number of symbols transmitted in a particular time interval is equal to a number of symbols expected by the receiving device.). If the number of symbols to be transmitted is less than the number expected the modulation mapper 902 may add additional redundant information to the transmission, including, as a non-limiting example, additional parity information, until the number of symbols being transmitted during the particular time interval matches the expected number of symbols for that interval.

As an example corresponding to DL transmissions of the PDSCH, a base station may modulate a codeword utilizing any suitable modulation scheme, including but not limited to QPSK, 16QAM, 64QAM, 256QAM, etc. According to this example, the VRB mapper 904 may only map a sequence to VRBs that meet a set of defined criteria, as described in clause 7.3.1.5 of Release 15 of 3GPP Technical Specification 38.211, the mapper will not map the sequence to other VRBs that do not meet those criteria. For example, the mapped VRBs must be within those VRBs that the gNB assigns for transmission (e.g., those resources that will be scheduled for a given UE in DCI). Further, the mapped VRBs corresponding PRBs must be declared as available (e.g., not declared as unavailable) for PDSCH transmission. Still further, the corresponding REs in the mapped VRBs corresponding PRBs must not be used for any of the following:

- transmission of the associated DM-RS or DM-RS intended for other co-scheduled UEs;
- non-zero-power CSI-RS if the corresponding PRBs are for PDSCH scheduled by PDCCH with a CRC scrambled by C-RNTI, MCS-C-RNTI, CS-RNTI, or PDSCH with SPS, except if the non-zero-power CSI-RS is a CSI-RS configured by the higher-layer parameter CSI-RS-Resource-Mobility in the MeasObjectNR information element, or except if the non-zero-power CSI-RS is an aperiodic non-zero-power CSI-RS resource; and
- a phase tracking reference signal (PT-RS).

And still further, the corresponding REs in the mapped VRBs' corresponding PRBs must not be declared as 'unavailable' for PDSCH transmission in accordance with clause 5.1.4 of Release 15 of 3GPP Technical Specification 38.214. For example, the corresponding REs cannot be occupied by an SSB, or declared as unavailable utilizing higher-layer (e.g., RRC) signaling. REs may also be unavailable for a PDSCH when the PDSCH is scheduled by a PDCCH with a CRC that is scrambled by a C-RNTI, MCS-C-RNTI, CS-RNTI, or PDSCHs with semi-persistent scheduling (SPS). This list is not intended to be exhaustive or limiting, and within various aspects of the present disclosure, a base station may utilize any suitable rules to declare such PRBs, and/or REs within such PRBs as unavailable for a PDSCH transmission. For a set of resources that are indicated as not available for PDSCH transmission, a UE may be configured with RB- and RE-level granularity.

The VRB mapper 904, when included in a base station or other scheduling entity, may further utilize "Type 0" or "Type 1" frequency domain resource allocation (FDRA) to schedule resources in a given VRB for a PDSCH.

While the above example is provided in the context of DL transmission of a PDSCH, it should be understood that the VRB mapper 904 may additionally or alternatively utilize a similar designation of resources as being unavailable for UL transmissions (e.g., of a PUSCH).

With Type 0 resource allocation a base station may provide a UE with a bitmap having bits that represent an allocation in multiples of resource block groups (RBG). In other words, each bit in the bitmap can inform a UE whether a corresponding RBG is allocated to that UE for DL communication. In some examples, the bitmap may define respective allocations for every RB or RBG within the frequency range of the bandwidth part (BWP) being used for the transmission.

In some examples, the bitmap may define respective allocations for only RBs/RBGs within only a portion of the BWP. For example, the portion of the BWP may be defined with respect to one or more subbands (e.g., DL or UL subbands defined by the slot format), such that the first bit in the bitmap corresponds to a first RB of the first subband of the one or more subbands, and such that the last bit in the bitmap corresponds to the last RB of the last subband of the one or more subbands (e.g., the "first" and "last" subbands can refer to the same subband if the bitmap is defined with respect to only one subband). In this way, the size of the bitmap may be reduced compared to examples in which the bitmap covers the entire frequency range of the BWP.

With Type 1 resource allocation a base station may provide a UE with an allocation of consecutive, contiguous RBs by transmitting, to the UE, information (e.g., in the DCI) representing a starting RB, and information representing a number of consecutive, contiguous RBs.

As an example, this resource allocation information may include a resource indicator value (RIV) that defines both the starting RB (sometimes referred to as $RB_{start}$) and the number of consecutive, contiguous RBs (sometimes referred to as $L_{RBs}$).

In some aspects of the disclosure, the resource allocation information may further include a subband index indicator that identifies one of a number of predefined subband indices. The starting RB of the RIV may be defined with respect to the particular subband index identified by the subband index indicator. For example, if there are two predefined subband indices, the subband index indicator may be a single binary bit. For example, the value of the binary bit may identify either the first of the two predefined subband indices or the second of the two predefined subband indices.

In some aspects of the disclosure, the base station may provide multiple RIVs in the DCI. In such aspects, each RIV corresponds to a distinct subband and the subband index indicator in the DCI may identify multiple (e.g., two or more) subbands. The respective starting RBs for each of the RIVs are then defined with respect to corresponding subband indices identified by the subband index indicator (e.g., with a one-to-one correspondence). As in the previous example, the UE may not perform a logical AND operation (or other equivalent operation) on the Type 1 resource allocation defined by the RIV(s) and the subband index indicator because, by defining the RIV(s) with respect to the subband(s) identified in the subband index indicator, conflict or overlap with other subbands may be avoided, thereby eliminating the need to perform the logical AND (or other equivalent operation).

By utilizing allocation Type 0, essentially any desired resource configuration can be provided, with any combination of bits in the bitmap being possible in theory. However, the bitmap provided in allocation Type 0 increases overhead. In comparison, a Type 1 resource allocation generally achieves significantly reduced overhead.

The PRB mapper 906 may then map the VRBs to PRBs according to either an interleaved or non-interleaved mapping scheme. With a non-interleaved mapping, the PRB mapper 906 essentially maps a VRB directly to its corresponding PRB. Interleaved mapping provides essentially for a shuffling among the different frequency subcarriers.

As discussed above, with SBFD, or flexible duplex, a portion (e.g., one or more subbands) of a carrier bandwidth may be utilized for UL, and another portion (e.g., one or more subbands) of the same carrier bandwidth may be utilized for DL communication. However, with the above-described Type 1 or Type 0 resource allocation performed by a VRB mapper 904, a conflict may result with SBFD. For example, a resource allocation for the PDSCH (as performed for a Type 1 or Type 0 resource allocation) may at least partially overlap with resources already designated in the slot format for the PUSCH in that same carrier. As another example, a resource allocation for PUSCH (as performed for a Type 1 or Type 0 resource allocation) may at least partially overlap with the resources designated in the slot format configuration for the PDSCH in that same carrier. Although in some particular cases, there may be a need for such an overlap between DL and UL transmissions, according to an aspect of the present disclosure, it may be desirable to avoid such an overlap in general with SBFD.

In some aspects of the disclosure, in order to correct for such overlap and to effectively determine the "real" or "usable" resource allocation for a given UL transmission, the UE associated with the transmission may perform a logical AND operation (or other suitable intersection operation) of the RBs allocated (e.g., via Type 0 or Type 1 allocation) for the UL transmission (e.g., of the PUSCH) and the RBs designated for UL transmission in the slot format. Additionally or alternatively, the UE may correct for such overlap and effectively determine the "real" or "usable" resource allocation for a given DL transmission, by performing a logical AND operation (or other suitable intersection operation) of the RBs allocated (e.g., via Type 0 or Type 1 allocation) for the DL transmission (e.g., of the PDSCH) and the RBs designated for DL transmission in the slot format.

Figure 10:
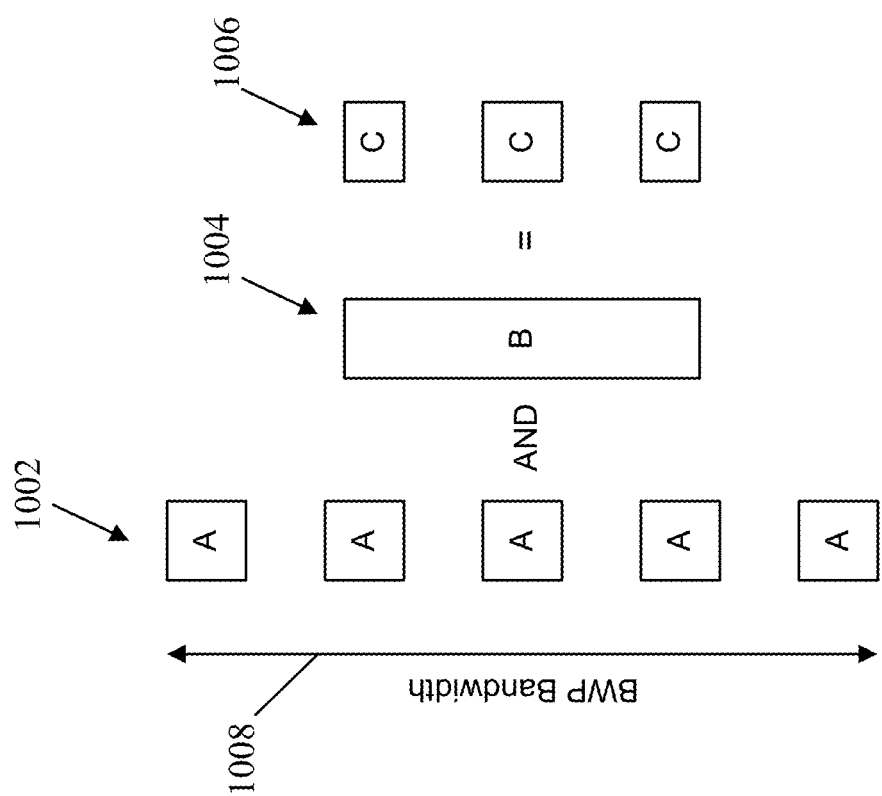
FIG. 10 is a diagram conceptually illustrating a logical operation that may be performed on resource allocations to determine a set of usable resources, according to some aspects.

FIG. 10 shows an example of a logical AND operation that a UE may perform to determine a set of usable resources for a given UL or DL transmission when Type 0 resource allocation is used. A base station may provide to the UE DCI that includes a Type 0 resource allocation 1002, designated here as "A." The allocation 1002 may correspond to a bitmap and RBG size.

In the present example (which may be referred to as "Type 0-Approach 1"), the Type 0 resource allocation 1002 is shown to span the entire BWP bandwidth 1008. In other examples (which may be referred to as "Type 0-Approach 2") the Type 0 resource allocation 1002 may only span the bandwidth of one or more subbands within the BWP bandwidth 1008 (e.g., effectively reducing the size of the bitmap). In Type 0-Approach 2 examples, with respect to a downlink allocation, total number of RBGs ($N_{RBG}$) for a downlink subband of size $N_{DL-SB}^{size}$ PRBs is given by $N_{RBG}=[N_{DL-SB}^{size}+(N_{DL-SB}^{size} \mod P)/P]$, where the size of the first RBG is $RBG_0^{size}=P-N_{DL-SB}^{start} \mod P$. The size of the last RBG is $RBG_{last}^{size}=(N_{DL-SB}^{start}-N_{DL-SB}^{size}) \mod P$ if $(N_{DL-SB}^{start}-N_{DL-SB}^{size}) \mod P>0$ and P otherwise. The size of all other RBGs is P (e.g., defined by the RBG size defined in the resource allocation). In other words, the last usable RBG belonging to the set of usable resources in a subband may be smaller than the RBG size, P (i.e., the number of RBGs in the set of usable resources within a subband need not be an integer multiple of the RBG size, P). $N_{DL-SB}^{start}$ is the PRB index of the starting (i.e., initial) RB of the DL subband. The bitmap may index the RBGs in order of increasing frequency of the subband or bandwidth part, starting at the lowest frequency thereof.

While the preceding example of a Type 0-Approach 2 resource allocation is provided in terms of a downlink subband and downlink allocation, it should be understood that such an approach would also be applicable for an uplink subband and uplink allocation. In some examples, determination of the set of usable resources can be simplified when a gNB allocates resources for SBFD such that the number of allocated resource blocks are always an integer multiple of the RBG size.

The slot format may define a group of resources (sometimes referred herein to as "available resources") 1004, designated here as "B," as being designated for the same transmission direction (e.g., UL or DL) as that of the resource allocation 1002. In the illustrated example, the resource allocation 1002 and the available resources 1004 only partially overlap. Thus, according to an aspect of the present disclosure, the UE may perform a logical AND operation (or other suitable intersection operation) of "A" and "B" to determine the set of usable resources 1006, designed here as "C." The UE may then receive or transmit corresponding DL or UL information in the resource blocks of the set of usable resources 1006. As shown, in some instances, the available resources "B" may only partially overlap with one of the RBGs of the resource allocation "A." This partial overlap results in the corresponding portion of the set of usable resources "C" spanning only a partial RBG, such at least one RBG boundary defined in the resource allocation "A" is misaligned from the set of usable resources "C".

Figure 11:
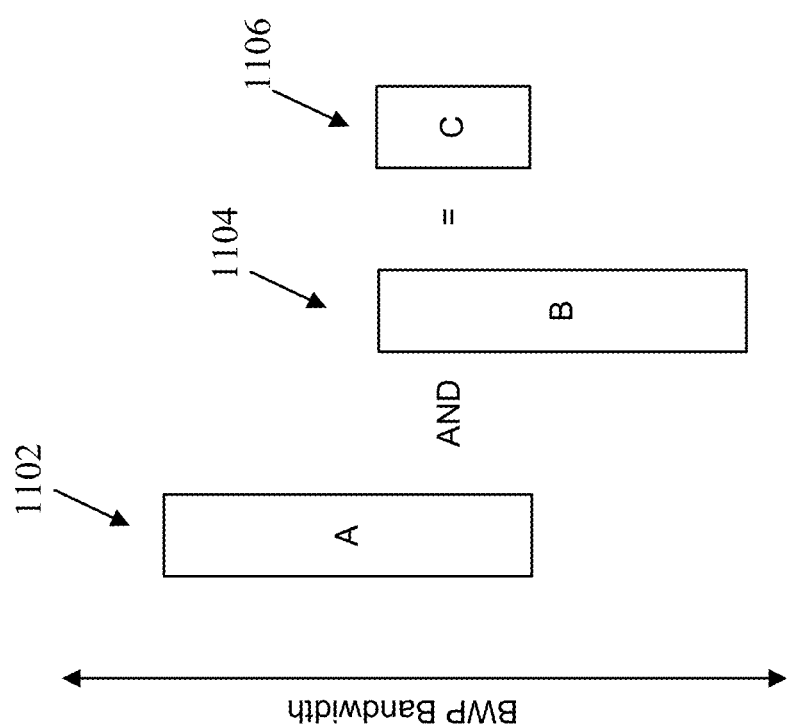
FIG. 11 is a diagram conceptually illustrating a logical operation that may be performed on resource allocations to determine a set of usable resources in connection with Type 1 allocations, according to some aspects.

FIG. 11 shows an example of a logical AND operation that the UE may perform to determine a set of usable resources for a given UL or DL transmission when Type 1 resource allocation is used. The Type 1 resource allocation 1102, designated here as "A," may be defined via a RIV. The UE may derive values for $RB_{start}$ and $L_{RBs}$ from the RIV. The base station may provide the UE with DCI including the RIV. As discussed above, the base station may define a group of available resources 1104, designated here as "B," via the slot format as being designated for the same transmission direction (e.g., UL or DL) as that of the resource allocation 1102. In the illustrated example, the resource allocation 1102 and the available resources 1104 only partially overlap. Thus, the UE may perform a logical AND operation (or other suitable intersection operation) of "A" and "B" to determine a set of usable resources 1106, designed here as "C." The UE may then receive or transmit corresponding DL or UL information in the resource blocks of the set of usable resources 1106.

In some aspects of the disclosure, it may not be necessary for the UE to perform a logical AND operation (or other equivalent operation) between resources specified by the slot format and a resource allocation, as in previously described examples. In such aspects, an RIV is defined with respect to the subband identified in the subband index indicator, allowing conflict or overlap with other subbands to be avoided. For example, the value of $RB_{start}$ may represent an offset from a starting RB of the identified subband. The identified subband may correspond directly to an entire uplink or downlink subband defined in the slot format. Alternatively, the identified subband may correspond to a portion of a downlink or uplink subband defined in the slot format. For example, the base station may set boundary conditions for the values of $RB_{start}$ and $L_{RBs}$ such that $RB_{start}$ corresponds to a RB within the identified subband and the sum $RB_{start}$+ $L_{RBs}$ does not exceed the length (in RBs) of the identified subband. Such boundary conditions may prevent conflict or overlap with other subbands.

Figure 12:
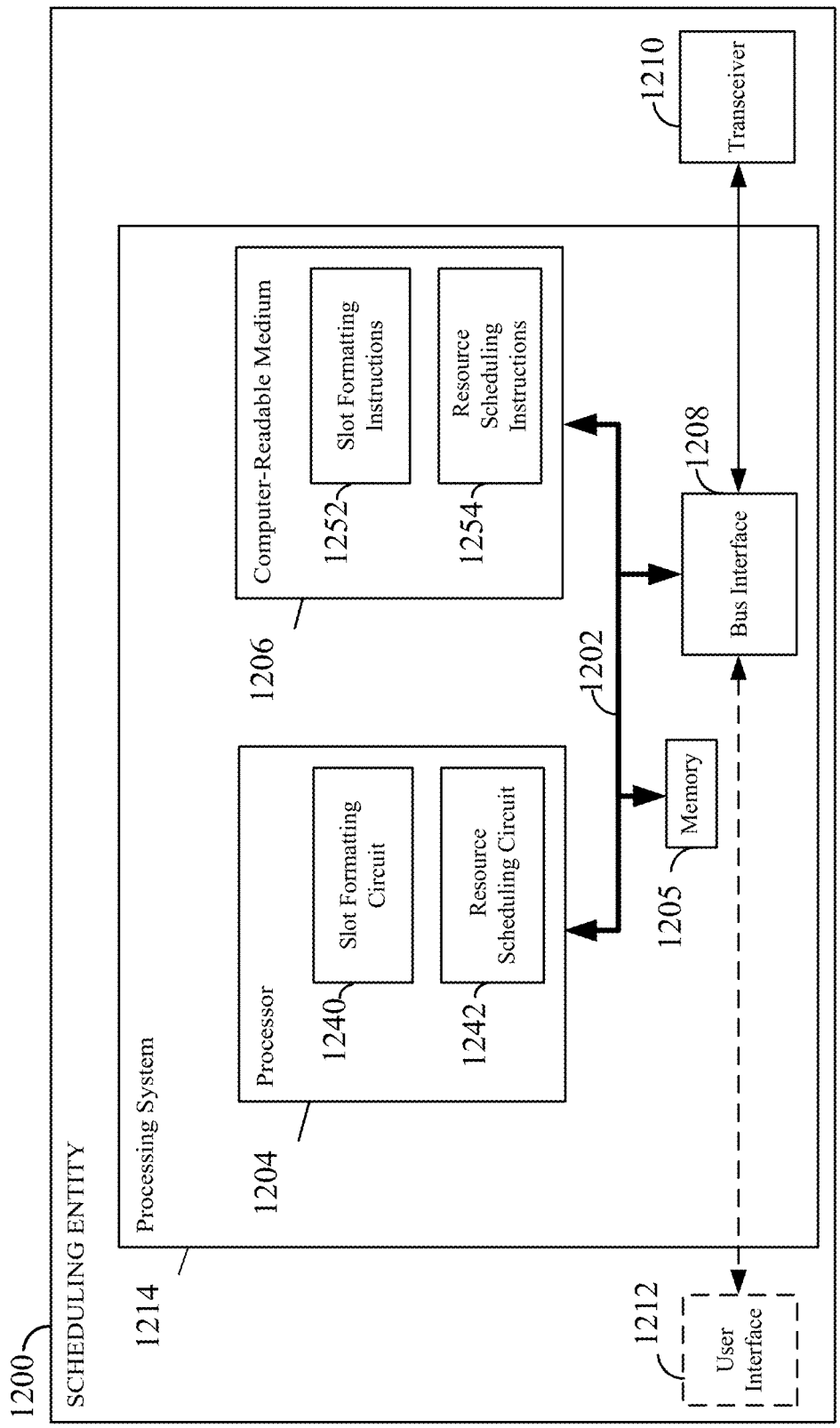
FIG. 12 is a block diagram conceptually illustrating an example of a hardware implementation for a scheduling entity according to some aspects.

FIG. 12 is a block diagram illustrating an example of a hardware implementation for a scheduling entity 1200 employing a processing system 1214. For example, the scheduling entity 1200 may be a base station as illustrated in any one or more of FIGS. 1, 2, and/or 4. In another example, the scheduling entity 1200 may be a UE as illustrated in any one or more of FIGS. 1 and/or 2.

The scheduling entity 1200 may include a processing system 1214 that includes one or more processors 1204. Examples of processors 1204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1200 may be configured to perform any one or more of the functions described herein. That is, the processor 1204, as utilized in a scheduling entity 1200, may be used to implement any one or more of the processes and procedures described below.

In this example, the processing system 1214 may include a bus architecture, represented generally by the bus 1202. The bus 1202 may include any number of interconnecting buses and bridges depending on the specific application of the processing system 1214 and the overall design constraints. The bus 1202 communicatively couples together various circuits including one or more processors (represented generally by the processor 1204), a memory 1205, and computer-readable media (represented generally by the computer-readable medium 1206). The bus 1202 may also link various other circuits such as timing sources, peripherals, voltage regulators, and power management circuits, which are well known in the art, and therefore, will not be described any further. A bus interface 1008 provides an interface between the bus 1202 and a transceiver 1210. The transceiver 1210 provides a communication interface or means for communicating with various other apparatus over a transmission medium. Depending upon the nature of the apparatus, a user interface 1212 (e.g., keypad, display, speaker, microphone, joystick) may also be provided. Of course, such a user interface 1212 is optional, and may be omitted in some examples, such as a base station.

In some aspects of the disclosure, the processor 1204 may include slot formatting circuitry 1240 configured for various functions, including, for example, determining and communicating to one or more UEs a slot format, including respective portions of a slot for UL communication, for DL communication, or, in some examples, resources that can be flexibly allocated for either UL or DL communication. The processor 1204 may further include resource scheduling circuitry 1242 configured for various functions, including, for example, determining and communicating to one or more UEs a resource allocation (e.g., a grant) for one or more slots or for one or more carriers.

The processor 1204 is responsible for managing the bus 1202 and general processing, including the execution of software stored on the computer-readable medium 1206. The software, when executed by the processor 1204, causes the processing system 1214 to perform the various functions described below for any particular apparatus. The computer-readable medium 1206 and the memory 1205 may also be used for storing data that is manipulated by the processor 1204 when executing software.

One or more processors 1204 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1206. The computer-readable medium 1206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1206 may reside in the processing system 1214, external to the processing system 1214, or distributed across multiple entities including the processing system 1214. The computer-readable medium 1206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 13:
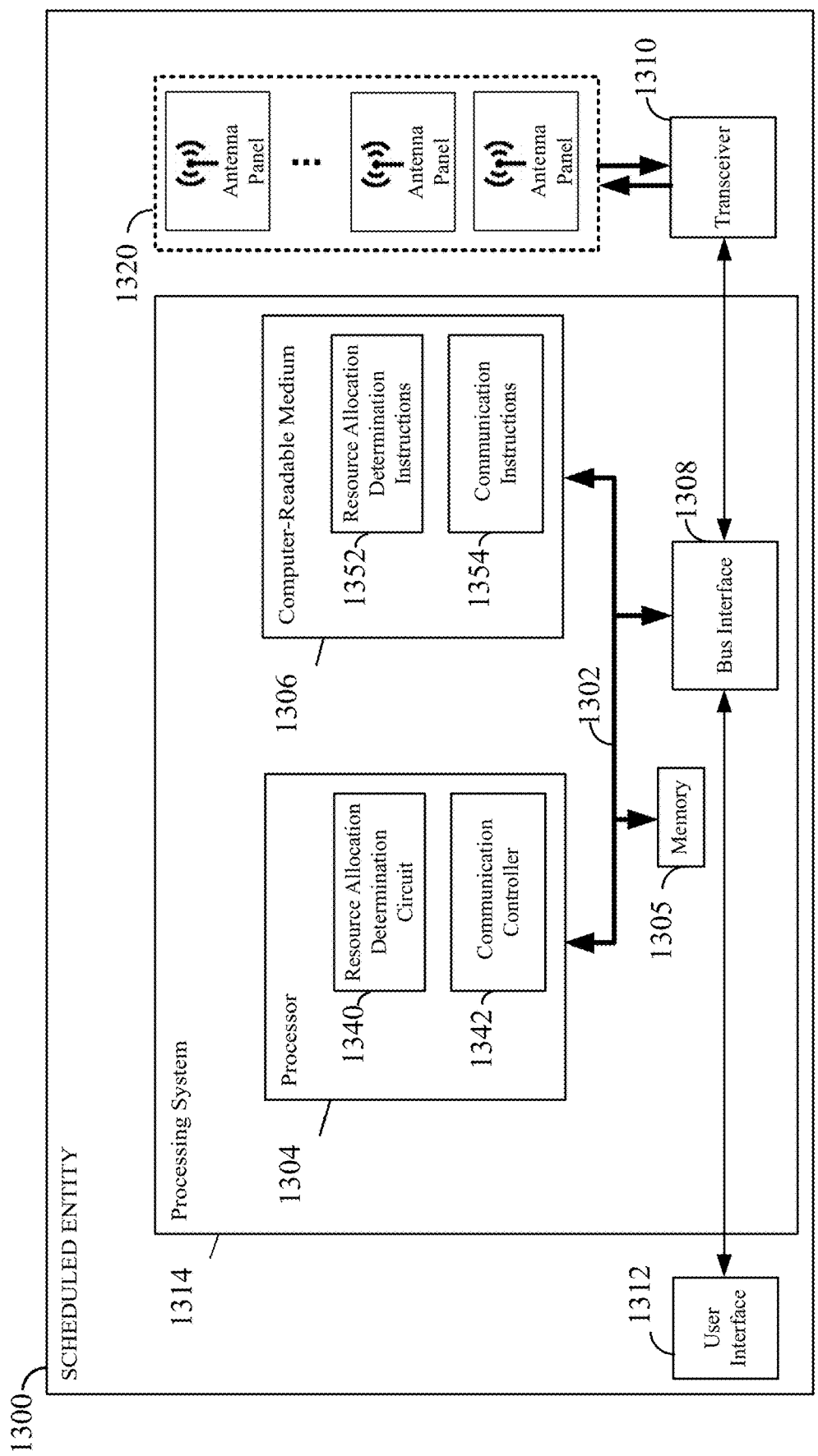
FIG. 13 is a block diagram conceptually illustrating an example of a hardware implementation for a scheduled entity according to some aspects.

FIG. 13 is a conceptual diagram illustrating an example of a hardware implementation for an exemplary scheduled entity 1300 employing a processing system 1314. In accordance with various aspects of the disclosure, an element, or any portion of an element, or any combination of elements may be implemented with a processing system 1314 that includes one or more processors 1304. For example, the scheduled entity 1300 may be a UE as illustrated in any one or more of FIGS. 1 and/or 2.

The processing system 1314 may be substantially the same as the processing system 1214 illustrated in FIG. 12, including a bus interface 1308, a bus 1302, memory 1305, a processor 1304, and a computer-readable medium 1306. Furthermore, the scheduled entity 1300 may include a user interface 1312 and a transceiver 1310 substantially similar to those described above in FIG. 12. That is, the processor 1304, as utilized in a scheduled entity 1300, may be used to implement any one or more of the processes described below and illustrated in FIGS. 14-19.

The transceiver 1310 is coupled to two or more antenna panels 1320 that are usable for transmission and reception of wireless signals. Each antenna panel 1320 may be an individual directional antenna that is either physically or electrically steerable (e.g., an electrically steerable phased array). In some examples, one or more antenna panels 1320 may be "virtual antennas" formed by dynamically addressing individual receiver elements in a reconfigurable array and operating those receiver elements as a phased array having characteristics desired for a particular application or desired at a particular point in time.

In some aspects of the disclosure, the processor 1304 may include resource allocation determination circuitry 1340 configured for various functions, including, for example, determining a set of usable resources based on a slot format configuration and a received Type 0 or Type 1 resource allocation. For example, the resource allocation determination circuitry 1340 may be configured to implement one or more of the functions described below in relation to FIGS. 14-19. The processor 1304 may further include a communication controller 1342 configured for various functions, including, for example, communicating over one or more wireless carriers.

UE Determination of Set of Usable Resources Given a Type 0 Resource Allocation

Some aspects of the present disclosure provide mechanisms and algorithms to determine a set of usable resources based on a Type 0 frequency domain resource allocation "A" (sometimes referred to as a "Type 0 resource allocation") and a group of available resources "B" (e.g., defined via the slot format) on a SBFD carrier.

While the description that follows refers to FIGS. 14-19, which illustrate processes that take place at a UE, it is to be understood that this disclosure is not limited to operations or processes at a UE. That is, the description that follows also describes processes and operations that take place at a base station, and the present disclosure is written to fully disclose operations at both endpoints of a signaling exchange between said UE and base station.

Figure 14:
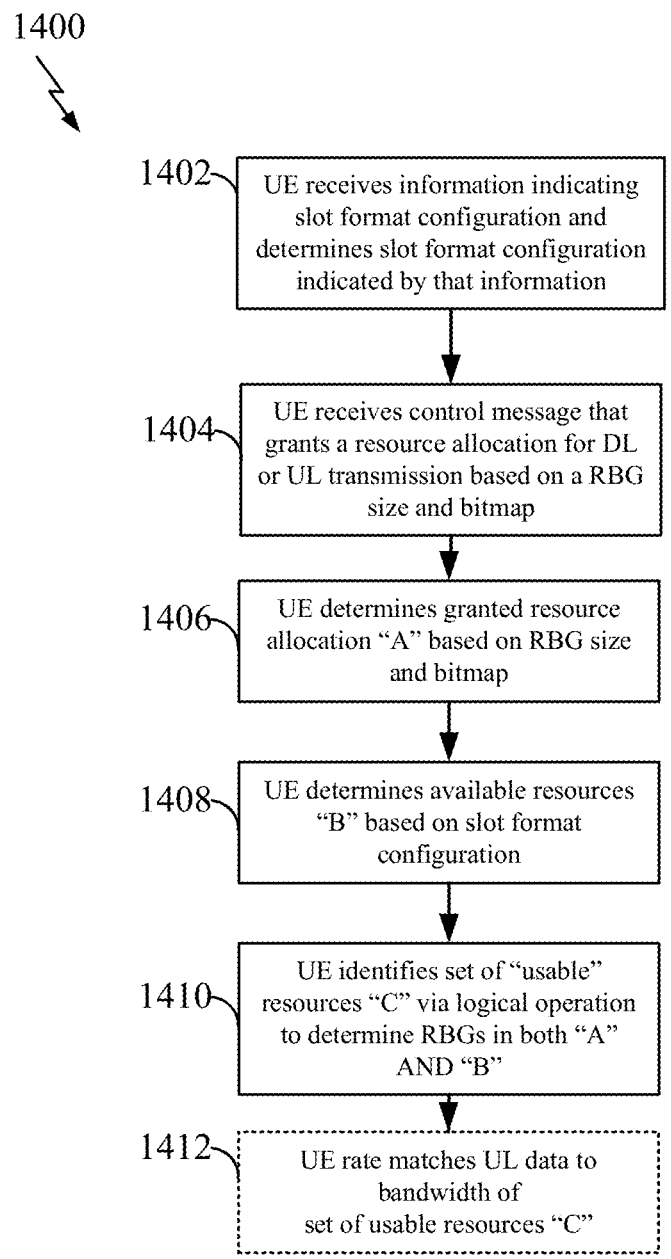
FIG. 14 is a flow chart illustrating an exemplary process for a UE to determine a set of usable resources based on a slot format configuration and a Type 0 resource allocation, according to some aspects.

FIG. 14 is a flow chart illustrating an exemplary process 1400 for a UE to determine a set of usable resources based on a Type 0 resource allocation on a SBFD carrier, in accordance with some aspects of the present disclosure. For example, a processor may determine a set of usable resources "C" based on a Type 0 frequency domain resource allocation "A" (sometimes referred to as a "Type 0 resource allocation") and a group of available resources "B" (defined via the slot format, for example) on a SBFD carrier. As described below, some or all illustrated features may be omitted in a particular implementation within the scope of the present disclosure, and some illustrated features may not be required for implementation of all embodiments. In some examples, the process 1400 may be carried out by the scheduled entity or UE 1300 illustrated in FIG. 13.

In some examples, the process 1400 may be carried out by any suitable apparatus or means for carrying out the functions or algorithm described below. In one example, the process 1400 may be performed by a processor (e.g., the processor 1304 of the scheduled entity 1300) in communication with a transceiver (e.g., the transceiver 1310), using resource allocation determination circuitry and a communication controller (e.g., the resource allocation determination circuit 1340 and the communication controller 1342) executing machine-readable instructions (e.g., the resource allocation determination instructions 1352 and the communication instructions 1354).

As described above, according to some examples, at block 1402 the UE receives information indicating slot format configuration from a transceiver (e.g., the transceiver 1310) and, using that information, determines a slot format configuration corresponding to a given slot in which the UE is to transmit or receive information. For example, the processor may receive an indication or configuration message from a base station sufficient for the UE to determine the slot format configuration for a given slot. The slot format configuration may designate portions (e.g., resources, resource blocks) of the slot as being designated for a particular transmission direction (e.g., for UL transmission or for DL transmission).

At block 1404, the UE receives a control message (e.g., DCI) that includes a Type 0 resource allocation for a given transmission direction (e.g., either a UL transmission to be sent by the UE or a DL transmission to be received by the UE). For example, the control message may include a RBG size and a bitmap that, together, define the Type 0 resource allocation. As described above, in some examples the bitmap may indicate whether each of the RBGs in the BWP of the SBFD carrier is included in the present Type 0 resource allocation. In other examples, the bitmap may define whether each of the RBGs in a subband of the BWP of the SBFD carrier is included in the present Type 0 resource allocation for the given transmission direction.

At block 1406, the UE determines a granted resource allocation "A" for the given transmission direction based on the RBG size and the bitmap included in the control message.

At block 1408, the UE determines a group of available resources "B" that are designated for the given transmission direction based on the slot format configuration.

At block 1410, the UE determines a set of usable resources "C" by performing a logical operation to determine an intersection of "A" and "B," with respect to frequency. For example, the set of usable resources "C" will include only the RBs that are included in both the granted resource allocation "A" and the available resources "B."

At block 1412, the UE optionally uses the communication controller to rate-match UL data to be transmitted over a set of resources supported by the set of usable resources "C." For example, the UE may determine that the encoded information representing the UL data is larger or smaller than the capacity of a set of resources provided by the set of usable resources "C." In this example, the UE may choose a code rate that ensures that the encoded UL data contains a number of symbols equal to (or no greater than) the capacity of the set of usable resources "C."

It will be appreciated that certain aspects of the example process 1400 and other processes described herein may be related to, and may implicitly describe, features or operation of a scheduling entity such as a base station in communication with the UE described above. For example, a base station may generate or otherwise communicate the slot configuration information and the downlink resource allocation to the UE. As an additional example, a base station may determine (or receive) the format of the allocation bitmap described in connection to block 1404. For instance, the base station may determine the size of the bitmap and signal information required to interpret that bitmap to the UE. In one example, the base station may generate the bitmap to correspond to all resources in the BWP available for communication with the UE. In another example, the base station may generate the bitmap to correspond to only one or more subbands within the BWP.

Figure 15:
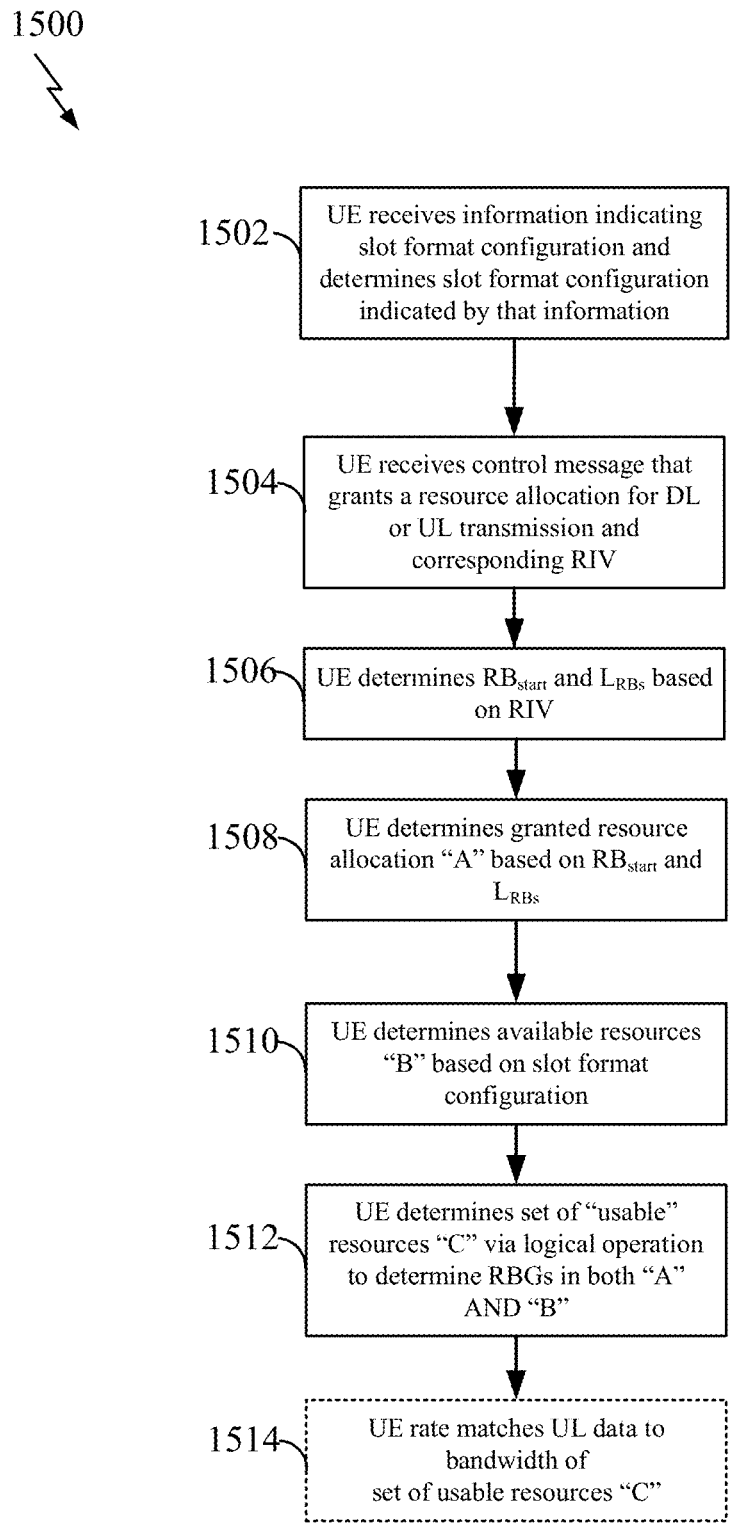
FIG. 15 is a flow chart illustrating an exemplary process for a UE to determine a set of usable resources based on a slot format configuration and a Type 1 resource allocation defined by a resource indicator value (RIV), according to some aspects.

UE Determination of Set of Usable Resources Given a Type 1 Resource Allocation without Subband Indexing FIG. 15 is a flow chart illustrating an exemplary process 1500 for a UE to determine a set of usable resources based on a Type 1 resource allocation without subband indexing on a SBFD carrier, in accordance with some aspects of the present disclosure. For example, the process 1500 may determine a set of usable resources "C" based on a Type 1 frequency domain resource allocation "A" (sometimes referred to as a "Type 1 resource allocation") and a group of available resources "B" (e.g., defined via the slot format) on a SBFD carrier. As described below, some or all illustrated features may be omitted in a particular implementation within the scope of the present disclosure, and some illustrated features may not be required for implementation of all embodiments. In some examples, the process 1500 may be carried out by the scheduled entity or UE 1300 illustrated in FIG. 13. In some examples, the process 1500 may be carried out by any suitable apparatus or means for carrying out the functions or algorithm described below.

In one example, the process 1500 may be performed by a processor (e.g., the processor 1304 of the scheduled entity 1300) in communication with a transceiver (e.g., the transceiver 1310), using resource allocation determination circuitry and a communication controller (e.g., the resource allocation determination circuit 1340 and the communication controller 1342) executing machine-readable instructions (e.g., the resource allocation determination instructions 1352 and the communication instructions 1354).

As in the example described in relation to FIG. 14, at block 1502 the UE receives information indicating slot format configuration from a transceiver (e.g., the transceiver 1310) and determines, using that information, a slot format configuration corresponding to a given slot in which the UE is to transmit or receive information using resource allocation determination circuitry such as the resource allocation determination circuit 1340. For example, the UE may receive an indication or configuration message from a base station sufficient for the UE to determine the slot format configuration for a given slot. The slot format configuration may designate portions (e.g., resources, resource blocks) of the slot as being designated for a particular transmission direction (e.g., for UL transmission or for DL transmission).

At block 1504, the UE receives a control message (e.g., DCI) that includes a Type 1 resource allocation for a given transmission direction (e.g., either a UL transmission to be sent by the UE or a DL transmission to be received by the UE). For example, the control message may include an RIV that defines the Type 1 resource allocation. As described above, the RIV may indicate values for $RB_{start}$ and $L_{RBs}$. The values for $RB_{start}$ and $L_{RBs}$ may define a set of consecutive, contiguous resource blocks (a "contiguous length") beginning at an RB index defined by $RB_{start}$ and including a number of resource blocks defined by $L_{RBs}$ that are allocated for the given transmission direction.

At block 1506, the UE determines the values of $RB_{start}$ and $L_{RBs}$ based on the RIV. For example, the RIV may be related to the values according to the following conditional set of equations:

if $(L_{RBs}-1) \le \lfloor N_{BWP}^{size}/2 \rfloor$, then $RIV = N_{BWP}^{size}(L_{RBs}-1) + RB_{start}$ else $RIV = N_{BWP}^{size}(N_{BWP}^{size} - L_{RBs} + 1) + (N_{BWP}^{size} - 1 - RB_{start})$ where $N_{BWP}^{size}$ is the size, in RBs, of the active BWP.

At block 1508, the UE determines a granted resource allocation "A" for the given transmission direction based on the values of $RB_{start}$ and $L_{RBs}$.

At block 1510, the UE determines a group of available resources "B" that are designated for the given transmission direction based on the slot format configuration.

At block 1512, the UE determines a set of usable resources "C" by performing a logical operation to determine an intersection of "A" and "B," with respect to frequency. For example, the set of usable resources "C" will include the RBs that are included in both the granted resource allocation "A" and the available resources "B."

At block 1514, the UE optionally uses the communication controller to rate-match UL data to be transmitted over a set of resources supported by the set of usable resources "C." For example, the UE may determine that the encoded information representing the UL data is larger or smaller than the capacity of a set of resources provided by the set of usable resources "C." In this example, the UE may choose a code rate that ensures that the encoded UL data contains a number of symbols equal to (or no greater than) the capacity of the set of usable resources "C."

As above, it will be appreciated that certain aspects of the example process 1500 and other processes disclosed may be related to, and may implicitly describe, features or operation of a scheduling entity such as a base station in communication with the UE described above. As a further example, a base station may generate and transmit a resource allocation signal using a Type 1 resource allocation algorithm. The base station may also further signal to the UE (via a DCI transmitted to the UE, for example) that the base station is employing Type 1 resource allocation and that the UE should use a corresponding algorithm to determine the resource allocation.

Figure 16:
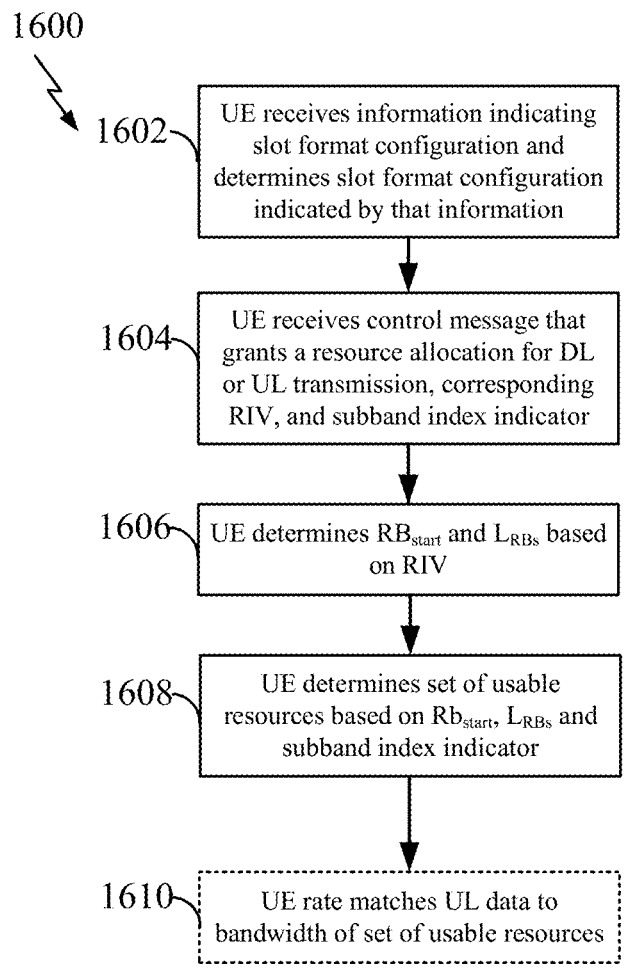
FIG. 16 is a flow chart illustrating an exemplary process for a UE to determine a set of usable resources based on a slot format configuration and a Type 1 resource allocation defined by a RIV and a subband index indicator, according to some aspects.

UE Determination of Set of Usable Resources Given a Type 1 Resource Allocation with Subband Indexing FIG. 16 is a flow chart illustrating an exemplary process 1600 for a UE to determine a set of usable resources based on a Type 1 resource allocation with subband indexing on a SBFD carrier, in accordance with some aspects of the present disclosure. As described below, some or all illustrated features may be omitted in a particular implementation within the scope of the present disclosure, and some illustrated features may not be required for implementation of all embodiments. In some examples, the process 1600 may be carried out by the scheduled entity or UE 1300 illustrated in FIG. 13. In some examples, the process 1600 may be carried out by any suitable apparatus or means for carrying out the functions or algorithm described below.

In one example, the process 1600 may be performed by a processor (e.g., the processor 1304 of the scheduled entity 1300) in communication with a transceiver (e.g., the transceiver 1310), using resource allocation determination circuitry and a communication controller (e.g., the resource allocation determination circuit 1340 and the communication controller 1342) executing machine-readable instructions (e.g., the resource allocation determination instructions 1352 and the communication instructions 1354).

As in the example described in relation to FIG. 14, at block 1602 the UE receives information indicating slot format configuration from a transceiver (e.g., the transceiver 1310) and determines, using that information, a slot format configuration corresponding to a given slot in which the UE is to transmit or receive information. For example, the UE may receive an indication or configuration message from a base station sufficient for the processor to determine the slot format configuration for a given slot using the resource allocation determination circuitry. The slot format configuration may designate portions (e.g., resources, resource blocks) of the slot as being designated for a particular transmission direction (e.g., for UL transmission or for DL transmission).

At block 1604, the UE receives a control message (e.g., DCI) that includes a Type 1 resource allocation for a given transmission direction (e.g., either a UL transmission to be sent by the processor or a DL transmission to be received by the UE). For example, the control message may include a subband index indicator and an RIV that defines the Type 1 resource allocation. The subband index indicator may identify one of a number of subband indices each representing subbands that are included in the active BWP. As described above, the RIV may represent values for $RB_{start}$ and $L_{RBs}$. The values for $RB_{start}$ and $L_{RBs}$ may define a set of consecutive, contiguous resource blocks beginning at an RB index defined by $RB_{start}$ and including a number of resource blocks defined by $L_{RBs}$ that are allocated for the given transmission direction. In the present example, the value of $RB_{start}$ is defined with respect to the subband identified by the subband index indicator. For example, $RB_{start}$ value of 0 may correspond to the first RB (e.g., highest frequency RB) of the identified subband, an $RB_{start}$ value of 1 may correspond to the second RB (e.g., second highest frequency RB) of the identified subband, and so on.

For example, the value of $RB_{start}$ may represent an offset from a starting RB of the identified subband. The identified subband may correspond directly to a downlink or uplink subband defined in the slot format. Alternatively, the identified subband may correspond to a portion of a downlink or uplink subband defined in the slot format. For example, the base station may set boundary conditions for the values of $RB_{start}$ and $L_{RBs}$ such that $RB_{start}$ corresponds to a RB within the identified subband and the sum $RB_{start}+L_{RBs}$ does not exceed the length (in RBs) of the identified subband. Such boundary conditions may prevent conflict or overlap with other subbands.

At block 1606, the UE, using the resource allocation determination circuitry, determines the values of $RB_{start}$ and $L_{RBs}$ based on the RIV. For example, the RIV may be related to the $RB_{start}$ and $L_{RBs}$ values as defined above in connection with FIG. 15.

At block 1608, the UE, using the resource allocation determination circuitry, determines a set of usable resources for the given transmission direction based on the values of $RB_{start}$ and $L_{RBs}$, with respect to the subband identified in the subband index indicator.

At block 1610, the UE optionally uses the communication controller to rate-match UL data to be transmitted over a set of resources supported by the set of usable resources "C." For example, the UE may determine that the encoded information representing the UL data is larger or smaller than the capacity of a set of resources provided by the set of usable resources "C." In this example, the UE may choose a code rate that ensures that the encoded UL data contains a number of symbols equal to (or no greater than) the capacity of the set of usable resources "C."

As above, it will be appreciated that certain aspects of the example process 1600 and other processes disclosed herein may be related to, and implicitly describe, features or operation of a scheduling entity such as a base station in communication with the UE described above. As a further example, a base station may generate and transmit a resource allocation signal using a Type 1 resource allocation algorithm that supports subband indexing to allocate resources from one or more subbands. The base station may also further signal to the UE (via a DCI transmitted to the UE, for example) that the base station is employing Type 1 resource allocation with sub-band indexing and that the UE should use a corresponding algorithm to determine the resource allocation.

Figure 17:
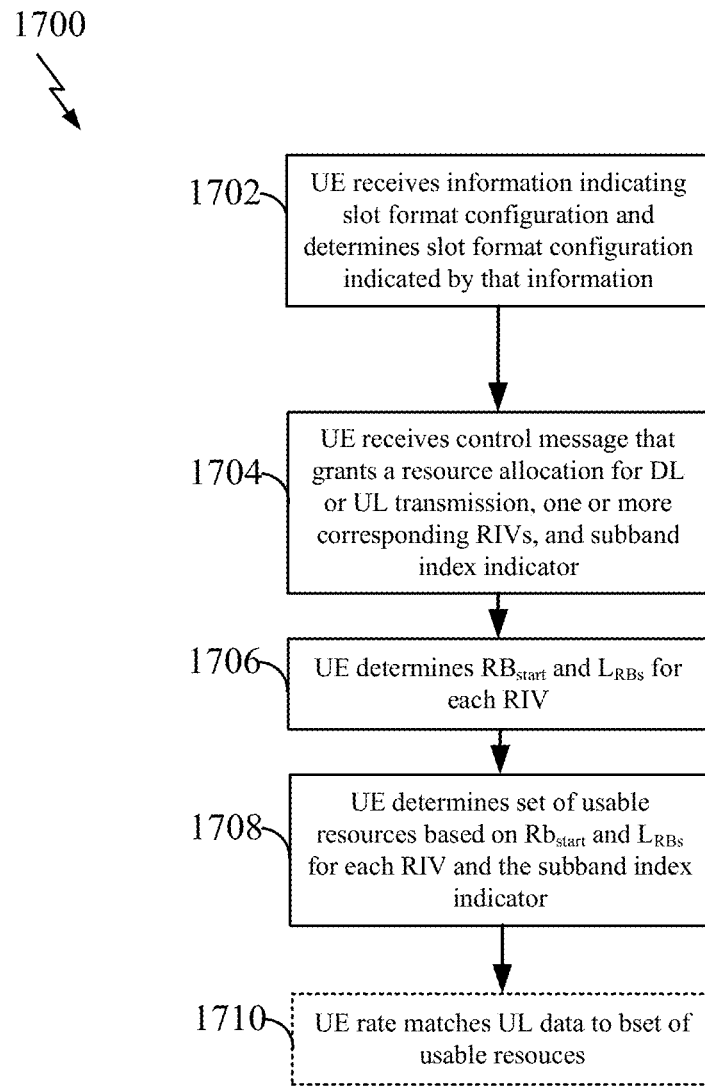
FIG. 17 is a flow chart illustrating an exemplary process for a UE to determine a set of usable resources based on a slot format configuration and a Type 1 resource allocation defined by multiple RIVs and a subband index indicator, according to some aspects.

UE Determination of Set of Usable Resources Given a Type 1 Resource Allocation with Subband Indexing and One or More RIVs FIG. 17 is a flow chart illustrating an exemplary process 1700 for a UE to determine a set of usable resources based on a Type 1 resource allocation with subband indexing and one or more RIVs on a SBFD carrier, in accordance with some aspects of the present disclosure. As described below, some or all illustrated features may be omitted in a particular implementation within the scope of the present disclosure, and some illustrated features may not be required for implementation of all embodiments. In some examples, the process 1700 may be carried out by the scheduled entity or UE 1300 illustrated in FIG. 13. In some examples, the process 1700 may be carried out by any suitable apparatus or means for carrying out the functions or algorithm described below.

In one example, the process 1700 may be performed by a processor (e.g., the processor 1304 of the scheduled entity 1300) in communication with a transceiver (e.g., the transceiver 1310), using resource allocation determination circuitry and a communication controller (e.g., the resource allocation determination circuit 1340 and the communication controller 1342) executing machine-readable instructions (e.g., the resource allocation determination instructions 1352 and the communication instructions 1354).

As in the example described in relation to FIG. 14, at block 1702 the UE uses a transceiver to receive information indicating slot format configuration (e.g., the scheduled entity 1300 uses the transceiver 1310) and determines (e.g., using the processor 1304), using that information, a slot format configuration corresponding to a given slot in which the UE is to transmit or receive information. For example, the UE may receive an indication or configuration message from a base station sufficient for the UE to determine the slot format configuration for a given slot. The slot format configuration may designate portions (e.g., resources, resource blocks) of the slot as being designated for a particular transmission direction (e.g., for UL transmission or for DL transmission).

At block 1704, the UE receives a control message (e.g., DCI) using the transceiver that includes a Type 1 resource allocation for a given transmission direction (e.g., either a UL transmission to be sent by the UE using the transceiver or a DL transmission to be received by the UE via the transceiver). For example, the control message may include a subband index indicator and one or more RIVs that define the Type 1 resource allocation. The subband index indicator may identify one or several subband indices each representing subbands that are included in the active BWP. As described above, each RIV may represent respective values for $RB_{start}$ and $L_{RBs}$, with each pair of $RB_{start}$ and $L_{RBs}$ values defining a set of consecutive, contiguous resource blocks beginning at an RB index defined by $RB_{start}$ and including a number of resource blocks defined by $L_{RBs}$ that are allocated for the given transmission direction. In the present example, a given $RB_{start}$ value is defined with respect to the subband identified by the subband index indicator to which the RIV associated with the given $RB_{start}$ value corresponds. For example, a given $RB_{start}$ having a value of 0 may correspond to the first RB (e.g., highest frequency RB) of the identified subband that corresponds to the RIV associated with that $RB_{start}$ value, a given $RB_{start}$ value of 1 may correspond to the second RB (e.g., second highest frequency RB) of the identified subband that corresponds to the RIV associated with that $RB_{start}$ value, and so on. For example, the value of a given $RB_{start}$ may represent an offset from a starting RB of the corresponding identified subband. The corresponding identified subband may correspond directly to a downlink or uplink subband defined in the slot format. Alternatively, the corresponding identified subband may correspond to a portion of a downlink or uplink subband defined in the slot format. For example, the base station may set boundary conditions for the values of $RB_{start}$ and $L_{RBs}$ such that $RB_{start}$ corresponds to a RB within the identified subband and the sum $RB_{start}+L_{RBs}$ does not exceed the length (in RBs) of the corresponding identified subband. Such boundary conditions may prevent conflict or overlap with other subbands.

At block 1706, the UE determines, using the resource allocation determination circuitry, pairs of $RB_{start}$ and $L_{RBs}$ values for each RIV included in the control message. For example, a given RIV may be related to the $RB_{start}$ and $L_{RBs}$ values as defined above in connection with FIG. 15.

At block 1708, the UE determines, using the resource allocation determination circuitry, a set of usable resources for the given transmission direction based on each pair of $RB_{start}$ and $L_{RBs}$ values, with respect to the corresponding subband(s) identified in the subband index indicator.

At block 1710, the UE optionally uses the communication controller to rate-match UL data to be transmitted over a set of resources supported by the set of usable resources "C." For example, the UE may determine that the encoded information representing the UL data is larger or smaller than the capacity of a set of resources provided by the set of usable resources "C." In this example, the UE may choose a code rate that ensures that the encoded UL data contains a number of symbols equal to (or no greater than) the capacity of the set of usable resources "C."

Figure 18:
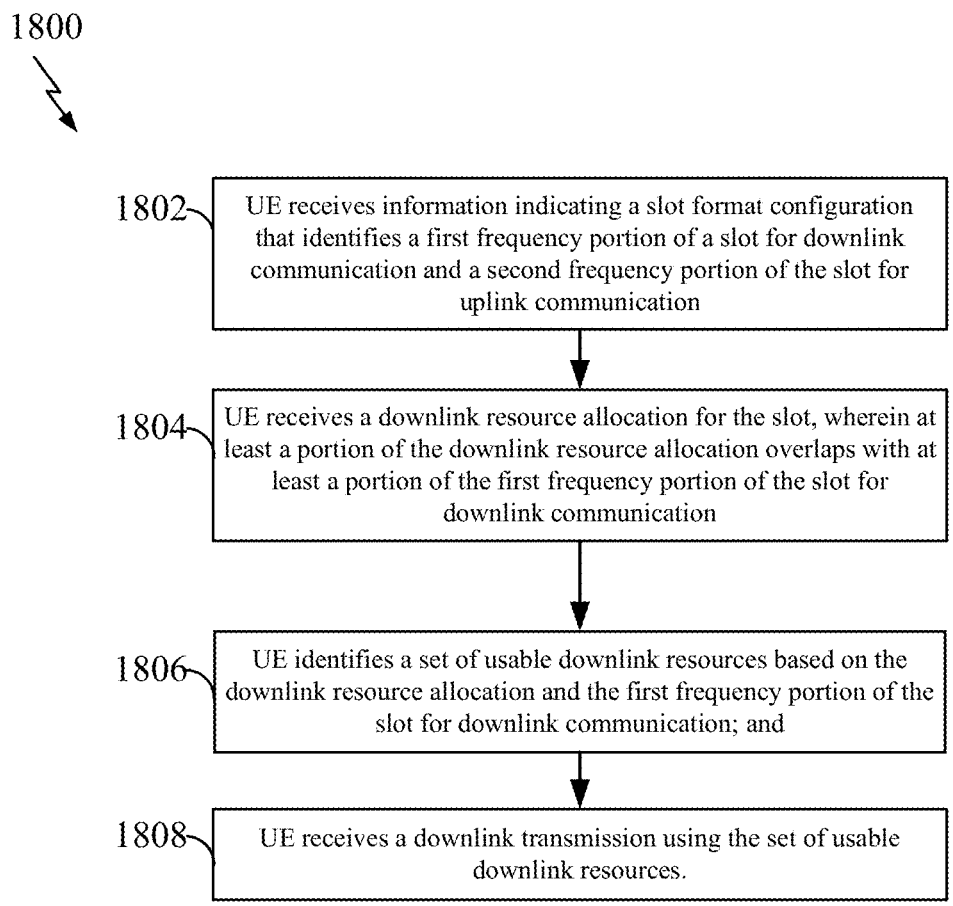
FIG. 18 is a flow chart illustrating an exemplary process for a UE to determine a usable downlink resource allocation and receive information based on a slot format configuration and a downlink resource allocation according to some aspects.

Additional Example Processes:

FIG. 18 is a flow chart illustrating an exemplary process 1800 for a UE to determine a usable downlink resource allocation and receive information in that usable allocation in accordance with some aspects of the present disclosure. As described below, some or all illustrated features may be omitted in a particular implementation within the scope of the present disclosure, and some illustrated features may not be required for implementation of all embodiments. In some examples, the process 1800 may be carried out by the scheduled entity or UE 1300 illustrated in FIG. 13. In some examples, the process 1800 may be carried out by any suitable apparatus or means for carrying out the functions or algorithm described below.

In one example, the process 1800 may be performed by a processor (e.g., the processor 1304 of the scheduled entity 1300) in communication with a transceiver (e.g., the transceiver 1310), using resource allocation determination circuitry and a communication controller (e.g., the resource allocation determination circuit 1340 and the communication controller 1342) executing machine-readable instructions (e.g., the resource allocation determination instructions 1352 and the communication instructions 1354).

At block 1802, the UE receives, using a transceiver (e.g., the transceiver 1310), information indicating a slot format configuration. The information identifies a first frequency portion of a slot for downlink communication and a second frequency portion of the slot for uplink communication.

At block 1804, the UE receives, via the transceiver, a downlink resource allocation for the slot. At least a portion of the downlink resource allocation overlaps with at least a portion of the first frequency portion of the slot for downlink communication.

At block 1806 the UE uses the resource allocation determination circuitry to identify a usable downlink resource allocation based on the downlink resource allocation and the first frequency portion of the slot for downlink communication.

At block 1808 the UE uses the communication controller to receive a downlink transmission in the usable downlink resource allocation via the transceiver.

Figure 19:
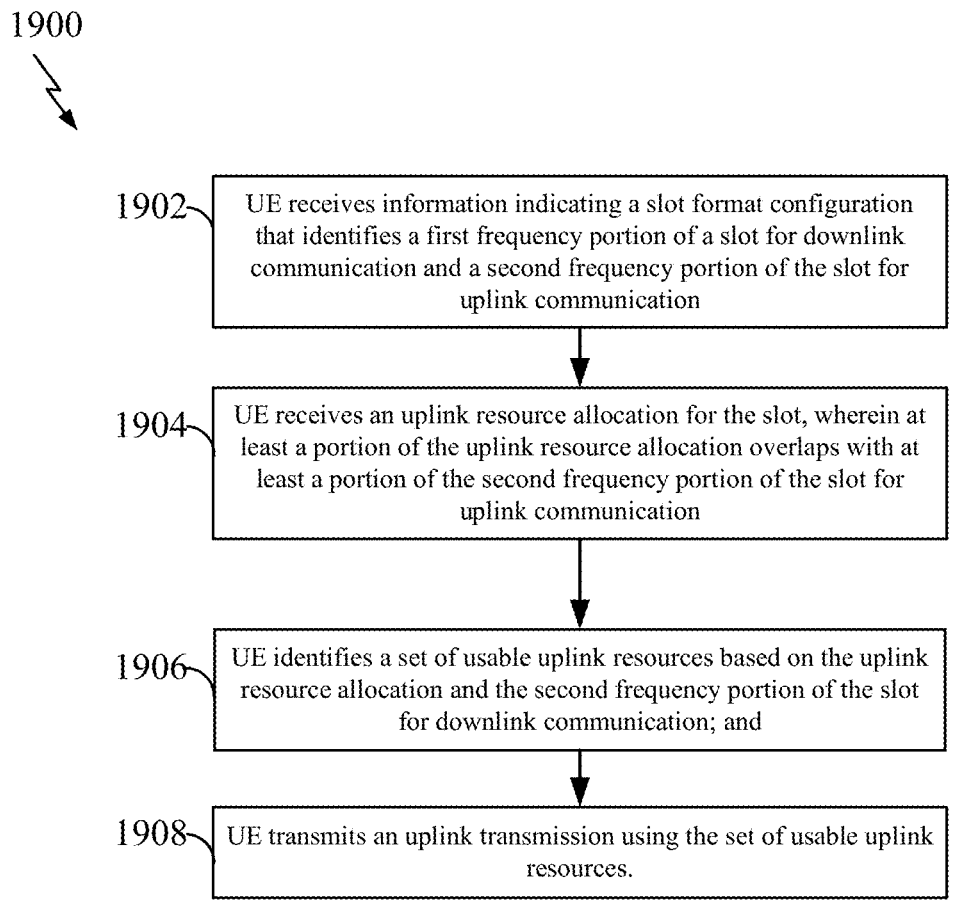
FIG. 19 is a flow chart illustrating an exemplary process for a UE to determine a usable uplink resource allocation and transmit information based on a slot format configuration and an uplink resource allocation according to some aspects.

FIG. 19 is a flow chart illustrating an exemplary process 1900 for a UE to determine a usable uplink resource allocation and transmit information in that usable allocation in accordance with some aspects of the present disclosure. As described below, some or all illustrated features may be omitted in a particular implementation within the scope of the present disclosure, and some illustrated features may not be required for implementation of all embodiments. In some examples, the process 1900 may be carried out by the scheduled entity or UE 1300 illustrated in FIG. 13. In some examples, the process 1900 may be carried out by any suitable apparatus or means for carrying out the functions or algorithm described below.

In one example, the process 1900 may be performed by a processor (e.g., the processor 1304 of the scheduled entity 1300) in communication with a transceiver (e.g., the transceiver 1310), using resource allocation determination circuitry and a communication controller (e.g., the resource allocation determination circuit 1340 and the communication controller 1342) executing machine-readable instructions (e.g., the resource allocation determination instructions 1352 and the communication instructions 1354).

At block 1902, the UE receives, via a transceiver such as the transceiver 1310, information indicating a slot format configuration. The information identifies a first frequency portion of a slot for downlink communication and a second frequency portion of the slot for uplink communication.

At block 1904, the UE receives, via the transceiver, an uplink resource allocation for the slot. At least a portion of the uplink resource allocation overlaps with at least a portion of the second frequency portion of the slot for uplink communication.

At block 1906 the UE uses the resource allocation determination circuitry to identify a usable uplink resource allocation based on the uplink resource allocation and the second frequency portion of the slot for uplink communication.

At block 1908 the UE uses the communication controller to transmit an uplink transmission in the usable downlink resource allocation via the transceiver.

Further Examples Having a Variety of Features:

Example 1: An apparatus, method, device, system, equipment, and/or article of manufacture for wireless communication as user equipment (a UE). Example 1 includes receiving information indicating a slot format configuration; receiving a resource allocation for the slot that overlaps with at least a portion of the first frequency portion; and communicating, using a transceiver over a set of usable resources that belongs to both the resource allocation and the first frequency portion. The information indicating the slot format configuration identifies a first frequency portion of a slot and a second frequency portion of the slot and one of the first or the second frequency portion is reserved for downlink communications and another of the first or the second frequency portion is reserved for uplink communications. Communicating over the set of usable resources comprises either receiving a downlink communication over the set of usable resources, or transmitting an uplink communication over the set of usable resources.

Example 2: The apparatus, method, device, system, equipment, and/or article of manufacture for wireless communication of Example 1, further including receiving a resource block group (RBG) size and a bitmap indicating a set of RBGs. Each RBG of the set has the RBG size, such that a subset of RBGs of the set of RBGs is designated by the resource allocation for the slot.

Example 3: The apparatus, method, device, system, equipment, and/or article of manufacture for wireless communication of Example 2, in which the RBGs indicated by the bitmap correspond to resources in the first frequency portion of the slot.

Example 4: The apparatus, method, device, system, equipment, and/or article of manufacture for wireless communication of Example 2, in which a first RBG indicated by the bitmap partially overlaps, with respect to frequency, the first frequency portion of the slot. In this example, a portion of the set of usable resources corresponding to the first RBG indicated by the bitmap includes a number of resource blocks (RBs) that is less than the RBG size.

Example 5: The apparatus, method, device, system, equipment, and/or article of manufacture for wireless communication of Example 1, further including receiving a resource indicator value (RIV) included in the resource allocation for the slot. In this example, communicating over the set of usable resources includes using, as the set of usable resources, a starting RB indicated by the RIV and a contiguous length of RBs indicated by the RIV. In this example, the resource allocation spans the contiguous length of RBs beginning at the starting RB.

Example 6: The apparatus, method, device, system, equipment, and/or article of manufacture for wireless communication of Example 1, further including receiving a resource indicator value (RIV) included in the resource allocation for the slot; and receiving a subband index indicator (SBI) that identifies a subband corresponding to a portion of the first frequency portion of the slot for downlink communication.

Example 7: The apparatus, method, device, system, equipment, and/or article of manufacture for wireless communication of Example 1, further including receiving a first resource indicator value (RIV) and a second RIV. The first and second RIVs are included in the resource allocation for the slot. In this example, communicating over the set of usable resources includes using, as the set of usable resources: a first contiguous length of RBs beginning at a first RB; and a second contiguous length of RBs beginning at a second RB. The first length and the first RB are indicated by the first RIV; and the second length and the second RB are indicated by the second RIV. In this example, the set of usable resources includes a first set of RBs that spans the first contiguous length of RBs beginning at a first starting RB and a second set of RBs that spans the second contiguous length of RBs beginning at a second starting RB.

Example 8: The apparatus, method, device, system, equipment, and/or article of manufacture for wireless communication of Example 1, further including receiving a subband index indicator (SBI) that identifies a first subband and a second subband. The set of usable resources includes: a first contiguous length of RBs beginning at a resource block in the first subband; and a second contiguous length of RBs beginning at an RB in the second subband.

Example 9: The apparatus, method, device, system, equipment, and/or article of manufacture for wireless communication of Example 1, in which the first frequency portion is a portion of a bandwidth part (BWP) reserved for downlink communications during a selected time interval; and the second frequency portion is a portion of the BWP reserved for uplink communications during the selected time interval.

Example 10: The apparatus, method, device, system, equipment, and/or article of manufacture for wireless communication of Example 1, in which the first frequency portion is a portion of a bandwidth part (BWP) reserved for uplink communications during a selected time interval; and the second frequency portion is a portion of the BWP reserved for downlink communications during the selected time interval.

Several aspects of a wireless communication network have been presented with reference to an exemplary implementation. As those skilled in the art will readily appreciate, various aspects described throughout this disclosure may be extended to other telecommunication systems, network architectures, and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features, and/or functions illustrated in FIGS. 1-19 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1-19 may be configured to perform one or more of the methods, features, or steps described herein.

The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication operable by user equipment (a UE), comprising:
    receiving, from a base station, information indicating a slot format configuration, the information identifying a first frequency portion of a slot and a second frequency portion of the slot, wherein one of the first or the second frequency portion of the slot is reserved for downlink communications and another of the first or the second frequency portion of the slot is reserved for uplink communications;
    receiving, from the base station, a resource allocation for the slot that overlaps with at least a portion of the first frequency portion; and
    communicating, with the base station, over a set of usable resources that belongs to both the resource allocation and the first frequency portion, wherein the set of usable resources is based at least in part on the resource allocation and the slot format configuration, and
    wherein communicating over the set of usable resources comprises either: receiving a downlink communication over the set of usable resources, or transmitting an uplink communication over the set of usable resources.

2. The method of claim 1, wherein receiving the resource allocation for the slot comprises:
    receiving, from the base station, a resource block group (RBG) size and a bitmap indicating a set of RBGs, each RBG of the set having the RBG size, such that a subset of RBGs of the set of RBGs is designated by the resource allocation for the slot.

3. The method of claim 2, wherein the RBGs indicated by the bitmap correspond to resources in the first frequency portion of the slot.

4. The method of claim 2, wherein:
    a first RBG indicated by the bitmap partially overlaps, with respect to frequency, the first frequency portion of the slot; and
    a portion of the set of usable resources corresponding to the first RBG indicated by the bitmap includes a number of resource blocks (RBs) that is less than the RBG size.

5. The method of claim 1, further comprising:
    receiving, from the base station, a resource indicator value (RIV) included in the resource allocation for the slot;
    wherein communicating over the set of usable resources includes using, as the set of usable resources, a starting RB indicated by the RIV and a contiguous length of RBs indicated by the RIV; and
    wherein the resource allocation spans the contiguous length of RBs beginning at the starting RB.

6. The method of claim 1, further comprising:
    receiving, from the base station, a resource indicator value (RIV) included in the resource allocation for the slot; and
    receiving, from the base station, a subband index indicator (SBI) that identifies a subband corresponding to a portion of the first frequency portion of the slot for downlink communication;
    wherein communicating over the set of usable resources includes using, as the set of usable resources, a contiguous length of RBs beginning at a starting RB in the subband indicated by the SBI; and
    wherein the starting RB is offset from an initial RB of the subband by a number of RBs corresponding to the RIV.

7. The method of claim 1, further comprising:
    receiving, from the base station, a first resource indicator value (RIV) and a second RIV, the first and second RIVs included in the resource allocation for the slot,
    wherein communicating over the set of usable resources includes using, as the set of usable resources:
        a first contiguous length of RBs beginning at a first RB, the first length and the first RB indicated by the first RIV; and
        a second contiguous length of RBs beginning at a second RB, the second length and the second RB indicated by the second RIV; and
    wherein the set of usable resources comprises a first set of RBs that spans the first contiguous length of RBs beginning at a first starting RB and further comprises a second set of RBs that spans the second contiguous length of RBs beginning at a second starting RB.

8. The method of claim 1, further comprising:
    receiving, from the base station, a subband index indicator (SBI) that identifies a first subband and a second subband;
    wherein the set of usable resources comprises:
        a first contiguous length of RBs beginning at a resource block in the first subband; and
        a second contiguous length of RBs beginning at an RB in the second subband.

9. The method of claim 1,
    wherein the first frequency portion is a portion of a bandwidth part (BWP) reserved for downlink communications during a selected time interval; and wherein the second frequency portion is a portion of the BWP reserved for uplink communications during the selected time interval.

10. The method of claim 1,
wherein the first frequency portion is a portion of a bandwidth part (BWP) reserved for uplink communications during a selected time interval; and
wherein the second frequency portion is a portion of the BWP reserved for downlink communications during the selected time interval.

11. A wireless communication device operable as user equipment (a UE), comprising:
one or more processors,
memory coupled to the one or more processors; and
a transceiver coupled to the one or more processors;
wherein the one or more processors are configured to cause the UE to:
receive, from a base station, information indicating a slot format configuration the information identifying a first frequency portion of a slot and a second frequency portion of the slot, wherein one of the first or the second frequency portion of the slot is reserved for downlink communications and another of the first or the second frequency portion of the slot is reserved for uplink communications;
receive, from the base station, a resource allocation for the slot that overlaps with at least a portion of the first frequency portion; and
communicate, with the base station, over a set of usable resources that belongs to both the resource allocation and the first frequency portion wherein the set of usable resources is based at least in part on the resource allocation and the slot format configuration, and
wherein communicating over the set of usable resources comprises either: receiving a downlink communication over the set of usable resources, or transmitting an uplink communication over the set of usable resources.

12. The wireless communication device of claim 11, wherein to receive the resource allocation, the one or more processors are configured to cause the UE to:
receive, from the base station, a resource block group (RBG) size and a bitmap indicating a set of RBGs, each RBG of the set having the RBG size, such that a subset of RBGs of the set of RBGs is designated by the resource allocation for the slot.

13. The wireless communication device of claim 12, wherein the RBGs indicated by the bitmap correspond to resources in the first frequency portion of the slot.

14. The wireless communication device of claim 12, wherein:
a first RBG indicated by the bitmap partially overlaps, with respect to frequency, the first frequency portion of the slot; and
a portion of the set of usable resources corresponding to the first RBG indicated by the bitmap includes a number of resource blocks (RBs) that is less than the RBG size.

15. The wireless communication device of claim 11, wherein the one or more processors are further configured to cause the UE to:
receive, from the base station, a resource indicator value (RIV) included in the resource allocation for the slot; and
communicate, with the base station, over the set of usable resources, including using, as the set of usable resources, a starting RB indicated by the RIV and a contiguous length of RBs indicated by the RIV; and
wherein the resource allocation spans the contiguous length of RBs beginning at the starting RB.

16. The wireless communication device of claim 11, wherein the one or more processors are further configured to cause the UE to:
receive, from the base station, a resource indicator value (RIV) included in the resource allocation for the slot; and
receive, from the base station, a subband index indicator (SBI) that identifies a subband corresponding to a portion of the first frequency portion of the slot for downlink communication;
wherein communicating over the set of usable resources includes using, as the set of usable resources, a contiguous length of RBs beginning at a starting RB in the subband indicated by the SBI; and
wherein the starting RB is offset from an initial resource block of the subband by a number of RBs corresponding to the RIV.

17. The wireless communication device of claim 11, wherein the one or more processors are further configured to cause the UE to:
receive, from the base station, a first resource indicator value (RIV) and a second RIV, the first and second RIVs included in the resource allocation for the slot, and
communicate, with the base station, over the set of usable resources, including using, as the set of usable resources:
a first contiguous length of RBs beginning at a first RB, the first length and the first RB indicated by the first RIV;
a second contiguous length of RBs beginning at a second RB, the second length and the second RB indicated by the second RIV; and
wherein the set of usable resources comprises a first set of RBs that spans the first contiguous length of RBs beginning at a first starting RB and further comprises a second set of RBs that spans the second contiguous length of RBs beginning at a second starting resource block.

18. The wireless communication device of claim 11, wherein the one or more processors are further configured to cause the UE to:
receive, from the base station, a subband index indicator (SBI) that identifies a first subband and a second subband; and
wherein the set of usable resources comprises:
a first contiguous length of RBs beginning at a resource block in the first subband; and
a second contiguous length of RBs beginning at an RB in the second subband.

19. The wireless communication device of claim 11,
wherein the first frequency portion is a portion of a bandwidth part (BWP) reserved for downlink communications during a selected time interval; and
wherein the second frequency portion is a portion of the BWP reserved for uplink communications during the selected time interval.

20. The wireless communication device of claim 11,
wherein the first frequency portion is a portion of a bandwidth part (BWP) reserved for uplink communications during a selected time interval; and wherein the second frequency portion is a portion of the BWP reserved for downlink communications during the selected time interval.

21. The wireless communication device of claim 11, wherein the resource allocation for the slot overlaps with at least the portion of the first frequency portion and at least a portion of the second frequency portion.

22. A wireless communication device operable as user equipment (a UE), comprising:
  means for receiving, from a base station, information indicating a slot format configuration, the information identifying a first frequency portion of a slot and a second frequency portion of the slot, wherein one of the first or the second frequency portion of the slot is reserved for downlink communications and another of the first or the second frequency portion of the slot is reserved for uplink communications;
  means for receiving, from the base station, a resource allocation for the slot that overlaps with at least a portion of the first frequency portion; and
  means for communicating, with the base station, over a set of usable resources that belongs to both the resource allocation and the first frequency portion, wherein the set of usable resources is based at least in part on the resource allocation and the slot format configuration, and
  wherein the means for communicating over the set of usable resources comprises either: means for receiving a downlink communication over the set of usable resources, or means for transmitting an uplink communication over the set of usable resources.

23. The wireless communication device of claim 22, wherein the means for receiving the resource allocation for the slot comprises:
  means for receiving, from the base station, a resource block group (RBG) size and a bitmap indicating a set of RBGs, each RBG of the set having the RBG size, such that a subset of RBGs of the set of RBGs is designated by the resource allocation for the slot.

24. The wireless communication device of claim 23, wherein the RBGs indicated by the bitmap correspond to resources in the first frequency portion of the slot.

25. The wireless communication device of claim 23, wherein:
  a first RBG indicated by the bitmap partially overlaps, with respect to frequency, the first frequency portion of the slot; and
  a portion of the set of usable resources corresponding to the first RBG indicated by the bitmap includes a number of resource blocks (RBs) that is less than the RBG size.

26. The wireless communication device of claim 22, further comprising:
  means for receiving, from the base station, a resource indicator value (MV) included in the resource allocation for the slot;
  wherein the means for communicating over the set of usable resources includes means for using, as the set of usable resources, a starting RB indicated by the RIV and a contiguous length of RBs indicated by the MV; and
  wherein the resource allocation spans the contiguous length of RBs beginning at the starting RB.

27. The wireless communication device of claim 22, further comprising:
  means for receiving, from the base station, a resource indicator value (MV) included in the resource allocation for the slot; and
  means for receiving, from the base station, a subband index indicator (SBI) that identifies a subband corresponding to a portion of the first frequency portion of the slot for downlink communication;
  wherein the means for communicating over the set of usable resources includes means for using, as the set of usable resources, a contiguous length of RBs beginning at a starting RB in the subband indicated by the SBI; and
  wherein the starting RB is offset from an initial RB of the subband by a number of RBs corresponding to the RIV.

28. The wireless communication device of claim 22, further comprising:
  means for receiving, from the base station, a first resource indicator value (MV) and a second RIV, the first and second RIVs included in the resource allocation for the slot,
  wherein the means for communicating over the set of usable resources includes means for using, as the set of usable resources:
    a first contiguous length of RBs beginning at a first RB, the first length and the first RB indicated by the first RIV; and
    a second contiguous length of RBs beginning at a second RB, the second length and the second RB indicated by the second RIV;
  and
  wherein the set of usable resources comprises a first set of RBs that spans the first contiguous length of RBs beginning at a first starting RB and further comprises a second set of RBs that spans the second contiguous length of RBs beginning at a second starting resource block.

29. The wireless communication device of claim 22, further comprising:
  means for receiving, from the base station, a subband index indicator (SBI) that identifies a first subband and a second subband;
  wherein the set of usable resources comprises:
    a first contiguous length of RBs beginning at a resource block in the first subband; and
    a second contiguous length of RBs beginning at an RB in the second subband.

30. The wireless communication device of claim 22, wherein the first frequency portion is a portion of a bandwidth part (BWP) reserved for downlink communications during a selected time interval; and
  wherein the second frequency portion is a portion of the BWP reserved for uplink communications during the selected time interval.

31. The wireless communication device of claim 22, wherein the first frequency portion is a portion of a bandwidth part (BWP) reserved for uplink communications during a selected time interval; and
  wherein the second frequency portion is a portion of the BWP reserved for downlink communications during the selected time interval.

* * * * *